(12) United States Patent
Koseki et al.

(10) Patent No.: US 9,690,096 B2
(45) Date of Patent: Jun. 27, 2017

(54) HEAD-UP DISPLAY APPARATUS

(71) Applicant: FUJITSU TEN LIMITED, Kobe-shi, Hyogo (JP)

(72) Inventors: Tomohisa Koseki, Kobe (JP); Masashi Hida, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 222 days.

(21) Appl. No.: 14/527,109

(22) Filed: Oct. 29, 2014

(65) Prior Publication Data

US 2015/0146299 A1    May 28, 2015

(30) Foreign Application Priority Data

Nov. 22, 2013 (JP) ................ 2013-241692

(51) Int. Cl.
*G02B 27/14* (2006.01)
*G02B 27/01* (2006.01)

(52) U.S. Cl.
CPC ..... *G02B 27/0101* (2013.01); *G02B 27/0149* (2013.01); *G02B 2027/014* (2013.01); *G02B 2027/0156* (2013.01)

(58) Field of Classification Search
CPC ........ G02B 27/0149; G02B 2027/0156; G02B 27/144; G02B 27/145

USPC .......................................... 359/629–630, 632
See application file for complete search history.

(56) References Cited

U.S. PATENT DOCUMENTS

2005/0024490 A1* 2/2005 Harada et al. ............... 348/115
2013/0194518 A1* 8/2013 Moussa et al. ............... 349/11
2014/0368097 A1* 12/2014 Yomogita ..................... 312/23

FOREIGN PATENT DOCUMENTS

| JP | H10-194009 A | 7/1998 |
| JP | 2004-189112 A | 7/2004 |
| JP | 2009-515768 A | 4/2009 |
| JP | A-2009-190646 | 8/2009 |
| JP | 2010-132129 A | 6/2010 |
| JP | A-2012-224124 | 11/2012 |
| JP | A-2013-159297 | 8/2013 |
| JP | 2013-535700 A | 9/2013 |

* cited by examiner

*Primary Examiner* — James Greece
(74) *Attorney, Agent, or Firm* — Oliff PLC

(57) ABSTRACT

When a head-up display apparatus is used, a combiner stored in a storage position in a housing is moved to a use position in front of the housing. Thus, a storage space in the housing becomes unoccupied. A projector is moved to a projection position in the storage space that becomes unoccupied and unused.

11 Claims, 27 Drawing Sheets

HEAD-UP DISPLAY APPARATUS

BACKGROUND OF THE INVENTION

Field of the Invention

The invention relates to a head-up display apparatus including a combiner.

Description of the Background Art

Recently, head-up display (HUD) apparatuses that can display various information overlapped with objects in the field of view of a user have been commercialized. In the case of a HUD apparatus including a combiner, an image displayed by a displaying device is enlarged and reflected by the combiner, and then the image appears as a virtual image in front of the combiner.

When such a head-up display apparatus is mounted on a vehicle, such as a car, a driver can obtain the various information by seeing the displayed virtual image, keeping looking ahead during driving a vehicle without significant change in the line of sight.

If the combiner of such a head-up display is continuously exposed to direct sunlight and dust in the air, the exposure may accelerate deterioration of the combiner. Therefore, some proposed head-up display apparatuses include a combiner that is configured to be stored in a housing when the combiner is not used and to be uncovered outside the housing only while being used.

Moreover, recently, a higher resolution of an image displayed by the head-up display apparatus is requested. A vacuum fluorescent display (VFD), a liquid crystal display (LCD) or another type of display devices that represent images by a combination of light of a plurality of picture elements is generally used as a display device of the head-up display apparatus. However, in a case where such a display device is used for the head-up display apparatus, it is difficult to improve resolution of an image because light of each picture element is enlarged by the combiner.

One solution to this problem is use of a projector that represents images on a screen by emitting projection light. Projectors can display the images with relatively high resolution on a relatively small screen so that the resolution of the image can be improved. However, the projectors need a space serving as a path of the projection light from a lens that emits the projection light to the screen. Therefore, in a case where the projector is used for the head-up display apparatus, the apparatus may be bigger.

In a case where the head-up display apparatus is configured to store the foregoing combiner, a space serving as a path of projection light is required in the housing, in addition to spaces for the storage and move of the combiner. As a result, the head-up display apparatus may be even bigger.

On the other hand, in order to place the head-up display apparatus freely, it is better for the apparatus to be as small as possible. Thus, even in the case where the projector is used for the head-up display apparatus, a technology that makes the apparatus smaller is requested.

SUMMARY OF THE INVENTION

According to one aspect of the invention, a head-up display apparatus includes: a projector that emits projection light to cause an image to be displayed on a screen; a combiner that reflects display light from the image displayed on the screen when the combiner is placed in a use position; a first moving mechanism configured to move the combiner between the use position and a storage position in a storage space; and a second moving mechanism configured to move the projector to a projection position in the storage space when the combiner is placed in the use position.

Since the projector is moved to the storage space that becomes unused when the head-up display apparatus is used, space in the head-up display apparatus can be effectively used. As a result, the head-up display apparatus can be smaller.

According another aspect of the invention, the second moving mechanism is configured to move the projector to a light path space when the combiner is placed in the storage position, the light path space serving as a part of a light path of the display light.

Since the projector is moved to the light path space that becomes unused when the head-up display apparatus is unused, the space in the head-up display apparatus can be effectively used further. As a result, the head-up display apparatus can be smaller.

According another aspect of the invention, the head-up display apparatus further includes a lid that closes the light path space when the combiner is placed in the storage position and that opens the light path space when the combiner is place in the use position. The projector is fixed to the lid and moves together with the lid.

Since the projector is fixed to the lid, a number of mechanisms can be reduced.

Therefore, an object of the invention is to make a head-up display apparatus smaller.

These and other objects, features, aspects and advantages of the invention will become more apparent from the following detailed description of the invention when taken in conjunction with the accompanying drawings.

DESCRIPTION OF THE EMBODIMENTS

An embodiment of the invention is hereinafter explained with reference to the drawings.

<1. Outline of Head-Up Display Apparatus>

Figure 1:
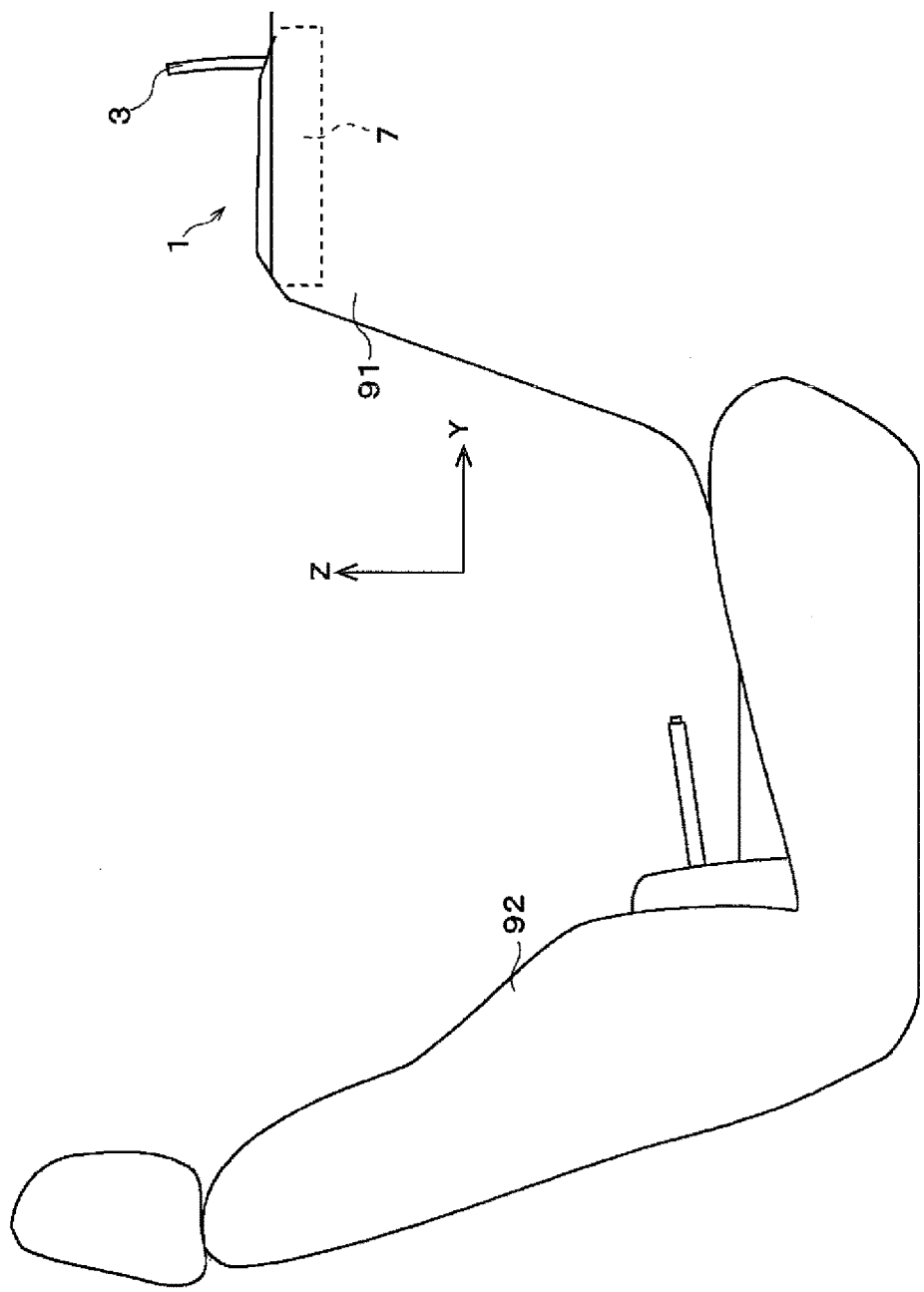
FIG. 1 shows an outline of a head-up display apparatus.

FIG. 1 shows an outline of a head-up display apparatus 1 in the embodiment. The head-up display apparatus 1 is mounted on a vehicle, such as a car, and is used in a cabin of the vehicle. FIG. 1 shows the cabin of the vehicle viewed from a right side of the vehicle. A right side of FIG. 1 shows a front side of the vehicle.

The head-up display apparatus 1 includes a housing 7 that stores mechanisms inside. As shown in FIG. 1, the housing 7 is embedded and fixed in an upper portion of a dashboard 91 located in a front area in the cabin. Thus, the head-up display apparatus 1 is mounted on the dashboard 91. A driver in a seat 92 of the vehicle, a user of the head-up display apparatus 1, uses the head-up display apparatus 1 disposed in front.

The head-up display apparatus 1 is configured to display various information overlapped with actual objects in the field of view of the driver. The head-up display apparatus 1 includes a combiner 3 that reflects display light. The combiner 3 is, for example, a light-reflective, transparent and concave half mirror. An image to be seen by the driver of the vehicle is presented as a virtual image in front of the combiner 3.

The driver can obtains various information by seeing the displayed virtual image, keeping looking ahead during driving the vehicle without changing the line of sight largely. The head-up display apparatus 1 displays speed of the vehicle and a route guidance and other necessary information for the driver. The head-up display apparatus 1, for example, is turned on in conjunction with turn-on of an automatic combustion control (ACC) switch and is turned off in conjunction with turn-off of the ACC switch.

Each of FIG. 2 to FIG. 5 shows a perspective view of an external appearance of the head-up display apparatus 1. In the explanation below, the three dimensional Cartesian coordinate system (XYZ) indicated in those drawings is used to show directions and orientations properly. The Cartesian coordinate system is fixed relative to the housing 7. An X-axis is equivalent to a left-right direction, a Y-axis is equivalent to a front-rear direction, and a Z-axis is equivalent to an up-down direction. A left side and the right side of the vehicle are represented by +X and −X, respectively. The front side and a rear side of the vehicle are represented by +Y and −Y, respectively (also, refer to FIG. 1). An upper side and a lower side of the vehicle are represented by +Z and −Z, respectively.

As shown in those drawings, a relatively small first opening 71, extending in the left-right direction (X-axis direction), is provided to a front (+Y side) upper portion of the housing 7. Moreover, a relatively large second opening 72 is provided to an upper surface of the housing 7 that is a back side (−Y side) of the first opening 71. The head-up display apparatus 1 includes a shutter 6 that opens and closes the first opening 71 and a lid 5 that opens and closes the second opening 72.

Figure 2:
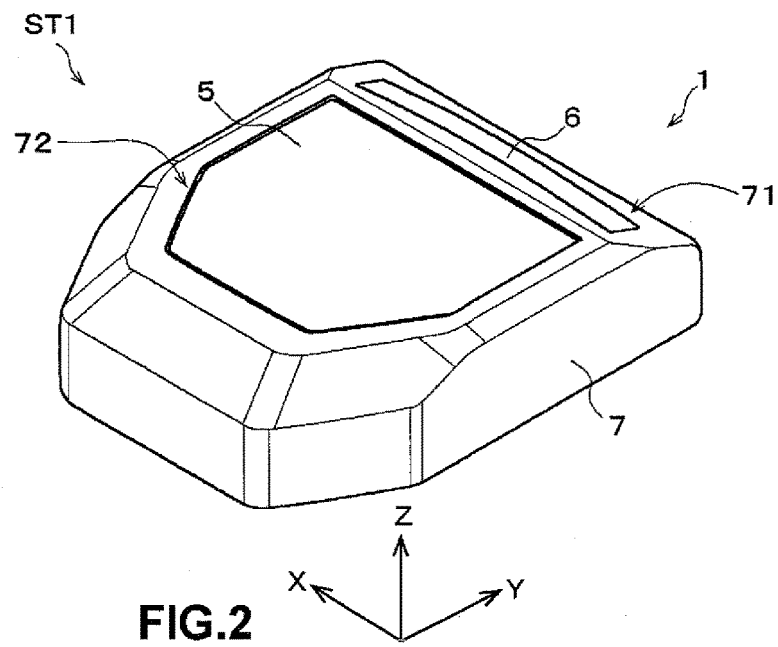
FIG. 2 is a perspective view of an external appearance of the head-up display apparatus.

During non-use (power-off) of the head-up display apparatus 1, the combiner 3 is not kept outside, as shown in FIG. 2, but is stored in the housing 7. Moreover, during the non-use, the shutter 6 closes the first opening 71 and the lid 5 closes the second opening 72. Thus, entering of a foreign object and direct sunlight into the housing 7 can be prevented and the combiner 3 can be protected. A state where the head-up display apparatus 1 is not used, as shown in FIG. 2, is hereinafter referred to as a "non-use state" ST1.

Figure 3:
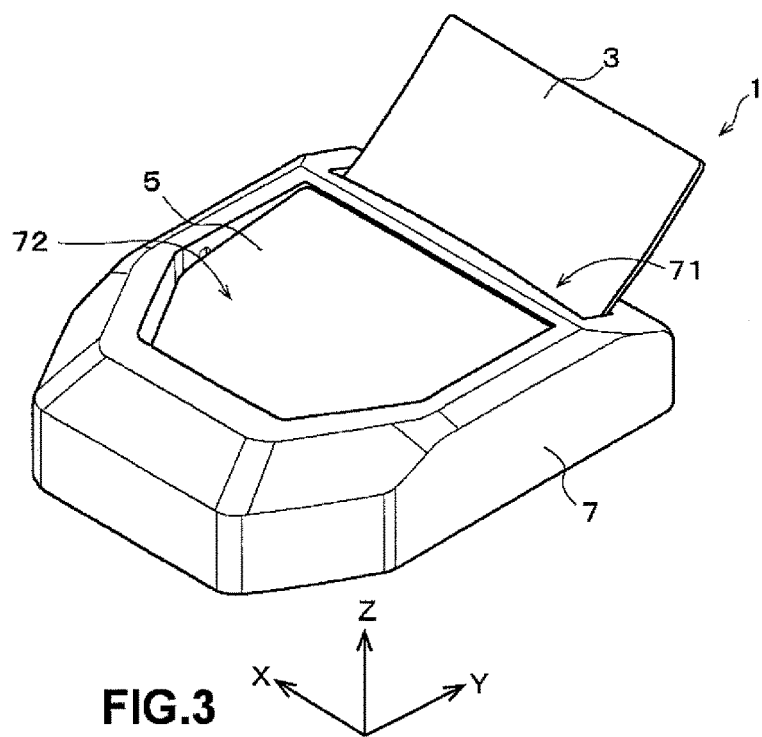
FIG. 3 is a perspective view of an external appearance of the head-up display apparatus.

When the head-up display apparatus 1 is turned on, the shutter 6 moves into the housing 7, as shown in FIG. 3, to open the first opening 71 and the combiner 3 is moved out from an inside of the housing 7 to a front side (+Y side) of the housing 7 via the first opening 71. Then the combiner 3 eventually comes out of the housing 7, as shown in FIG. 4 and FIG. 5, and is placed, standing from the first opening 71 on the front side (+Y side) of the housing 7.

Moreover, in parallel with the foregoing move of the combiner 3, a rear side (−Y side) of the lid 5 moves into the housing 7 to open the second opening 72. Thus, a screen 40 placed on a rear side (−Y side) in the housing 7, as shown in FIG. 5, appears. A projector 4, described later, (refer to FIG. 6) emits projection light and the image is displayed on the screen 40. During use of the head-up display apparatus 1, the image displayed on the screen 40 is enlarged and reflected by the combiner 3 serving as a concave mirror and is presented as the virtual image in front (+Y side) of the combiner 3. A state where the head-up display apparatus 1 is used, shown in FIG. 4 and FIG. 5, is hereinafter referred to as a "used state" ST2.

Figure 4:
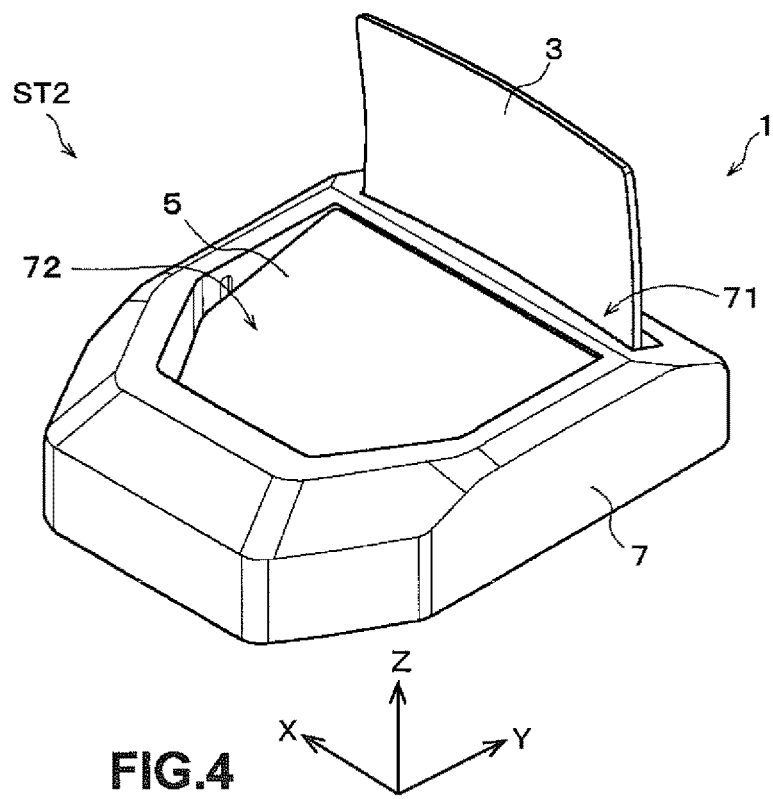
FIG. 4 is a perspective view of an external appearance of the head-up display apparatus.
Figure 5:
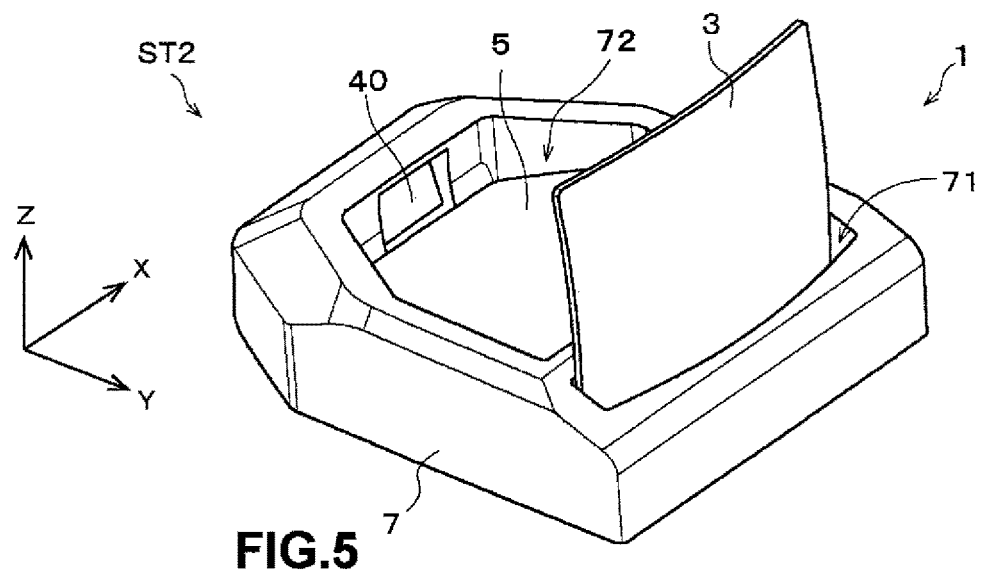
FIG. 5 is a perspective view of an external appearance of the head-up display apparatus.

When being turned off, the head-up display apparatus 1 returns to the non-use state ST1 shown in FIG. 2 from the use state ST2 shown in FIG. 4 and FIG. 5 via a state shown in FIG. 3.

<2. Electrical Configuration of the Head-Up Display Apparatus>

Figure 6:
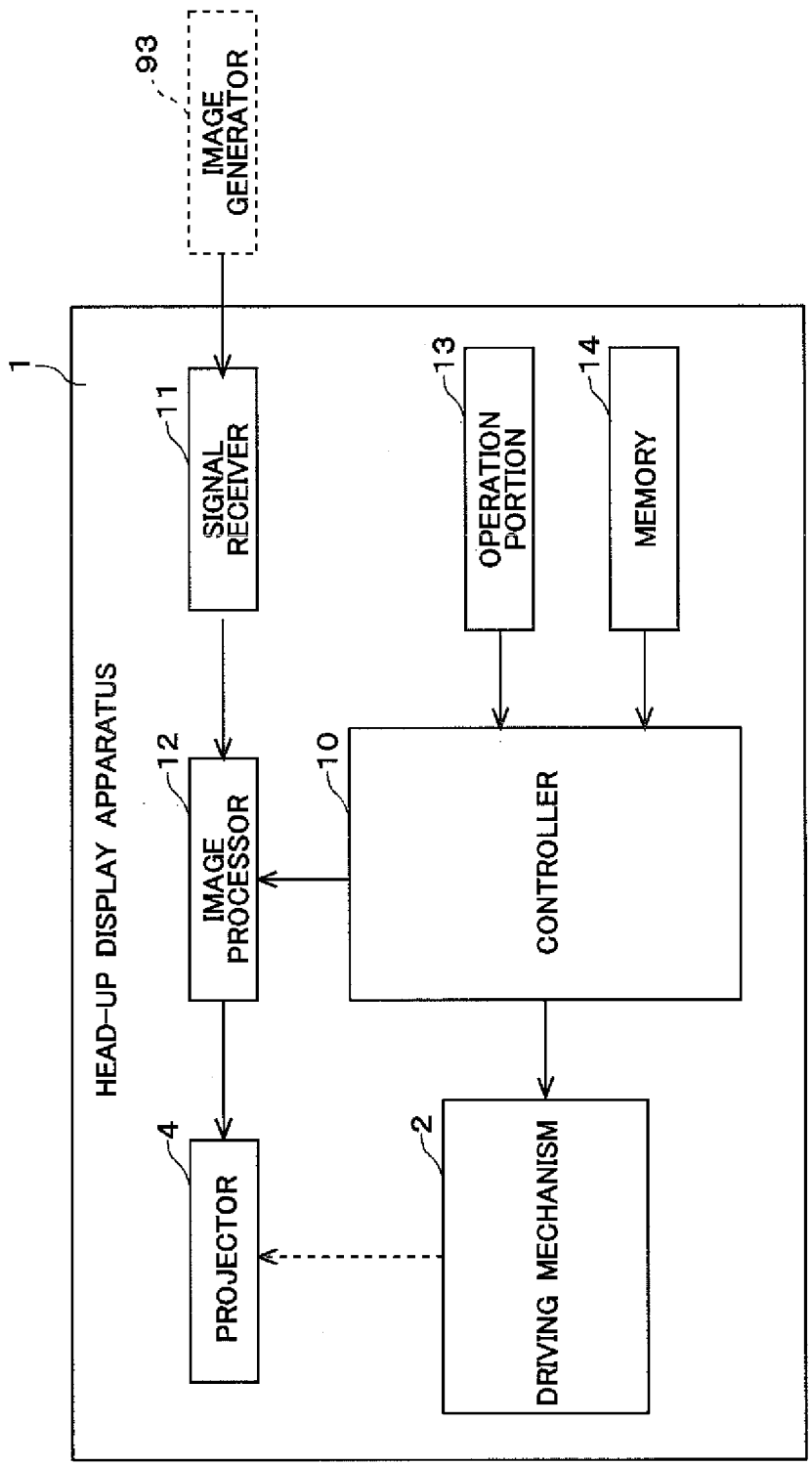
FIG. 6 shows an electrical configuration of the head-up display apparatus.

Next, an electrical configuration of the head-up display apparatus 1 is explained. FIG. 6 shows the electrical configuration of the head-up display apparatus 1. The head-up display apparatus 1 has a function of displaying the image based on an image signal after receiving the image signal from a separate image generator 93, such as a navigation system, that generates the image to be displayed.

The head-up display apparatus 1 includes a signal receiver 11, an image processor 12 and the projector 4. The signal receiver 11 receives the image signal from the image generator 93. The image processor 12 performs processing of the image signal received by the signal receiver 11, necessary for display, and then outputs the processed image signal to the projector 4. The projector 4 emits the projection light from a lens based on the image signal representing the image, using a method, such as DLP and LCOS, and projects the image on the screen 40 (refer to FIG. 5). Thus, the image is presented.

The head-up display apparatus 1 further includes a driving mechanism 2, an operation portion 13, a memory 14 and a controller 10. The driving mechanism 2 is configured to move the combiner 3, the projector 4, the lid 5 and the shutter 6, mentioned above, and other portions of the head-up display apparatus 1. The driving mechanism 2 is described later in detail.

The operation portion 13 is an operation member that receives a user operation. The operation portion 13 is disposed, for example, on a steering wheel of the vehicle and receives an operation from the driver. The driver can give a predetermined instruction, using the operation portion 13.

The memory 14 is, for example, a flash memory or another non-volatile storage that can store various data. The various data necessary for the head-up display apparatus 1 to work is stored in the memory 14.

Moreover, the controller 10 is a microcomputer including, for example, a CPU, a RAM or a ROM, and comprehensively controls the entire head-up display apparatus 1. Each function of the controller 10 is performed by execution of a program stored in the memory 14 beforehand, executed by the CPU. While controlling the process performed by the image processor 12, the controller 10 controls work of the driving mechanism 2. For example, in response to the user operation made with the operation portion 13, the controller 10 controls the work of the driving mechanism 2 and adjusts an angle of a reflective surface of the combiner 3.

<3. Physical Configuration of the Head-Up Display Apparatus>

Figure 7:
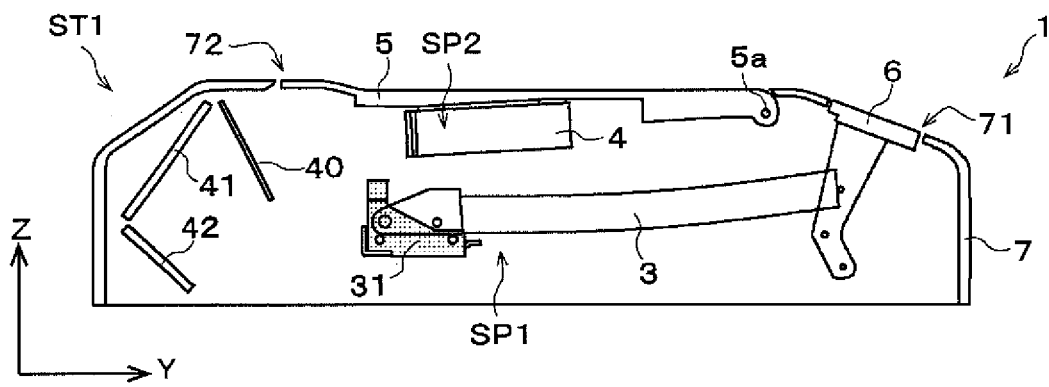
FIG. 7 shows a key physical configuration of the head-up display apparatus.
Figure 8:
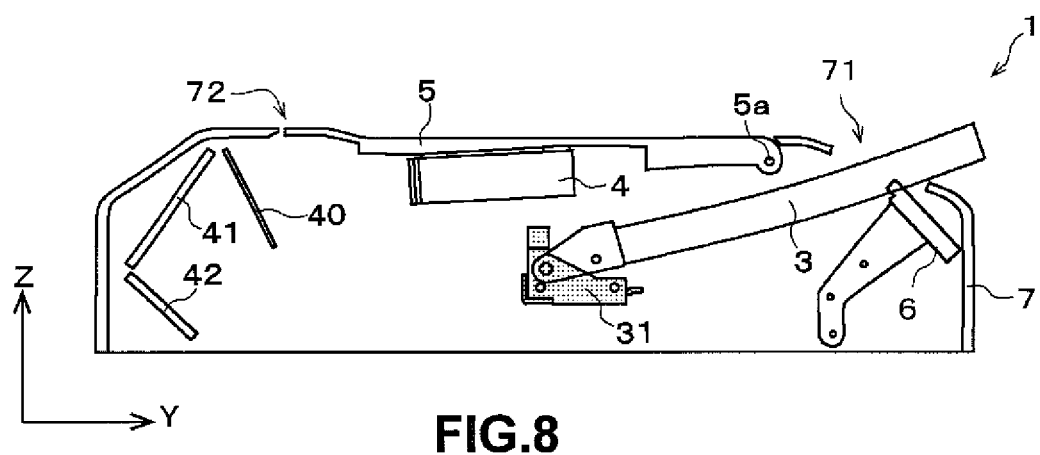
FIG. 8 shows a key physical configuration of the head-up display apparatus.
Figure 9:
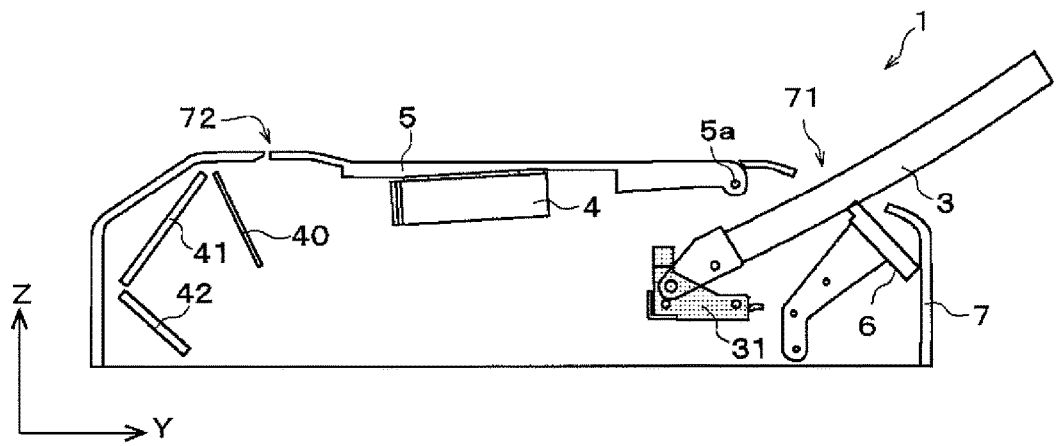
FIG. 9 shows a key physical configuration of the head-up display apparatus.
Figure 10:
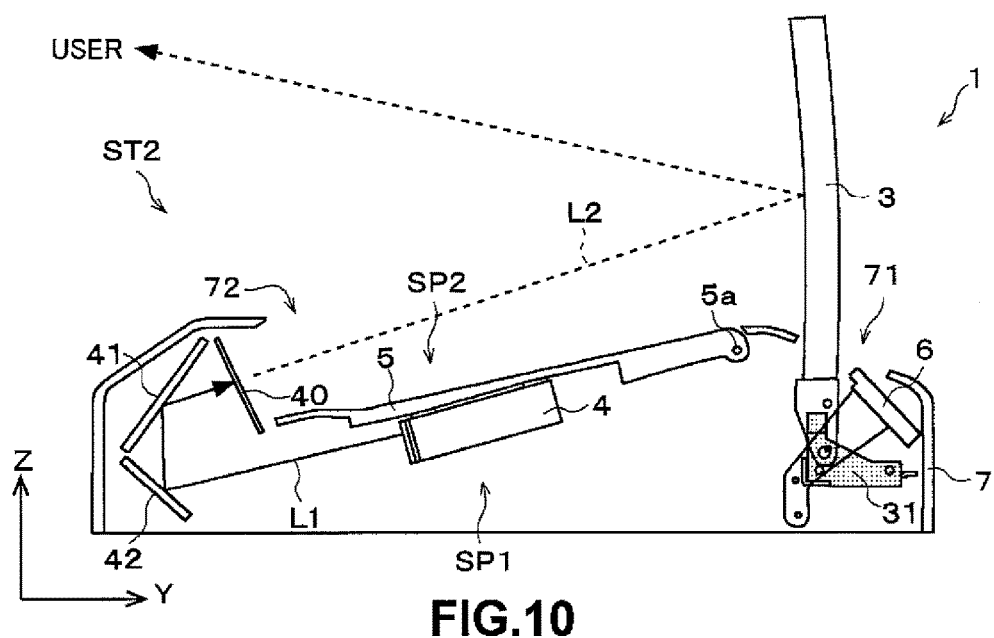
FIG. 10 shows a key physical configuration of the head-up display apparatus.

Next, a physical configuration of the head-up display apparatus is explained. Each of FIG. 7 to FIG. 10 shows a key physical configuration of the head-up display apparatus 1, viewed from a right side (−X side) of the head-up display apparatus 1. FIG. 7 shows the non-use state ST1 and FIG. 10 shows the use state ST2. Moreover, each of FIG. 8 and FIG. 9 shows a transitional state from the non-use state ST1 or the use state ST2 to the other state.

As shown in these drawings, the head-up display apparatus 1 includes a slide chassis 31 in the housing 7. The slide chassis 31 moves linearly in the front-rear direction (Y-axis direction) as a part of the driving mechanism 2. The slide chassis 31 is connected to a lower portion of the combiner 3 and moves the combiner 3.

In the non-use state ST1, as shown in FIG. 7, the combiner 3 is stored in a predetermined position (hereinafter referred to as "storage position") in the housing 7. In the non-use state ST1, a lower area in the housing 7 is used as a storage space SP1 for storage of the combiner 3.

When the head-up display apparatus 1 changes from the non-use state ST1 to the use state ST2, as shown in FIG. 8 and in FIG. 9, the slide chassis 31 moves forward (+Y side) in a horizontal direction. The move of the slide chassis 31 causes the combiner 3 to move forward (+Y side) while changing an angle relative to the horizontal direction to stand gradually. The combiner 3 is moved out of the housing 7 via the first opening 71 opened by move of the shutter 6. Then, as shown in FIG. 10, the combiner 3 stands via the first opening 71 in the use state ST2 and is placed at a predetermined position (hereinafter referred to as "use position) on the front side (+Y side) of the housing 7. When changing from the use state ST2 to the non-use state ST1, the combiner 3 moves reversely from the use position to the storage position.

Further, the projector 4 is fixed on an underside surface (a surface facing the inside of the housing 7) of the lid 5. The lid 5 is rotatably connected to the housing 7 via a rotation axis 5a and rotates about the rotation axis 5a. Thus, the projector 4 moves and rotates around the rotation axis 5a together with the lid 5.

In the non-use state ST1, as shown in FIG. 7, the lid 5 closes the second opening 72. Therefore, the projector 4 fixed on the underside surface of the lid 5 is placed in a predetermined position in an upper area in the housing 7 in the non-use state ST1. At the time, the projector 4 is placed above the combiner 3 placed in the storage position.

As the head-up display apparatus 1 changes from the non-use state ST1 to the use state ST2, the lid 5 rotates around the rotation axis 5a and the rear side (−Y side) of the lid 5 moves downward (−Z side), as shown in FIG. 10. Thus, the lid 5 opens the second opening 72. The projector 4 moves together with the lid 5 to be placed in a predetermined position (hereinafter referred to as "projection position") in the lower area in the housing 7.

When the projector 4 placed in the projection position emits projection light L1 from the lens of the projector 4, the projection light L1 is reflected by a plurality of mirrors 41 and 42 provided on the rear side (−Y side) in the housing 7 and reaches the screen 40. Thus, the projector 4 placed in the projection position projects the image on a back surface (−Y side) of the screen 40 and the image is displayed on the screen 40.

The screen 40 is a semi-transparent screen that enables an image projected to the back surface (−Y side) of the screen 40 to be seen from a front surface (+Y side) of the screen 40. As shown in FIG. 10, display light L2 from the image displayed on the front surface (+Y side) of the screen 40 reaches the combiner 3 placed in the use position, via the opened second opening 72. Then, the display light L2 is reflected by the combiner 3 and reaches the eyes of the driver or the user. Thus, the driver can see the image presented as the virtual image in front (+Y side) of the combiner 3.

In the use state ST2, as described above, the upper area in the housing 7 is used as a light path space SP2 that serves as a part of a light path of the display light L2. The lid 5 closes the light path space SP2 in the non-use state ST1 (refer to FIG. 7) and opens the light path space SP2 in the use state ST2 (refer to FIG. 10).

Further, in the use state ST2 where the combiner 3 is placed in the use position, the lower storage space SP1 in the housing 7 is unoccupied. Therefore, as shown in FIG. 10, the projector 4 is moved to the projection position in the storage space SP1 that is unoccupied and unused in the use state ST2. Accordingly, space in the housing 7 can be used efficiently.

On the other hand, in the non-use state ST1 where the combiner 3 is placed in the storage position in the storage space SP1, the upper light path space SP2 in the housing 7 is unused and unoccupied. Therefore, as shown in FIG. 7, the projector 4 is moved to the light path space SP2 that is unoccupied and unused in the non-use state ST1. Accordingly, the space in the housing 7 is used more efficiently. As a result, since the housing 7 can be smaller, the head-up display apparatus 1 can be smaller.

At least a portion of the projection position and the storage position overlap such that the projector 4 cannot be located in the projection position while the combiner 3 is located in the storage position.

Figure 11:
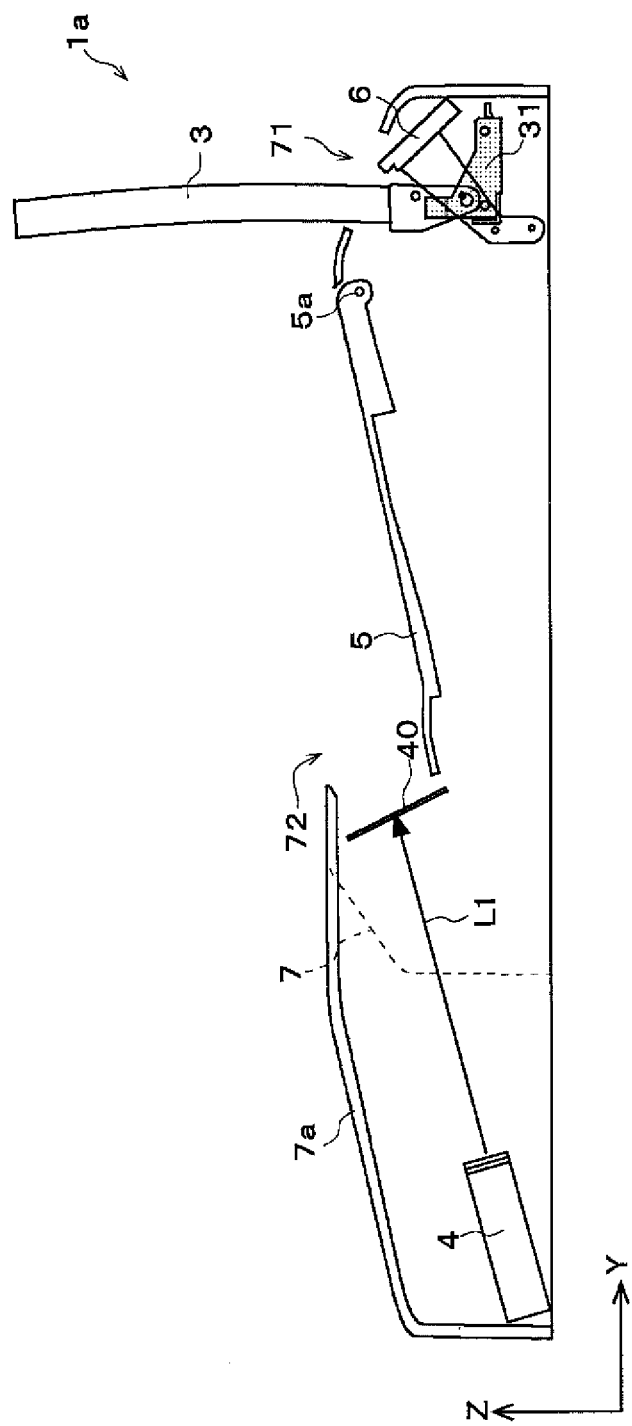
FIG. 11 shows a comparative example of the head-up display apparatus.
Figure 12:
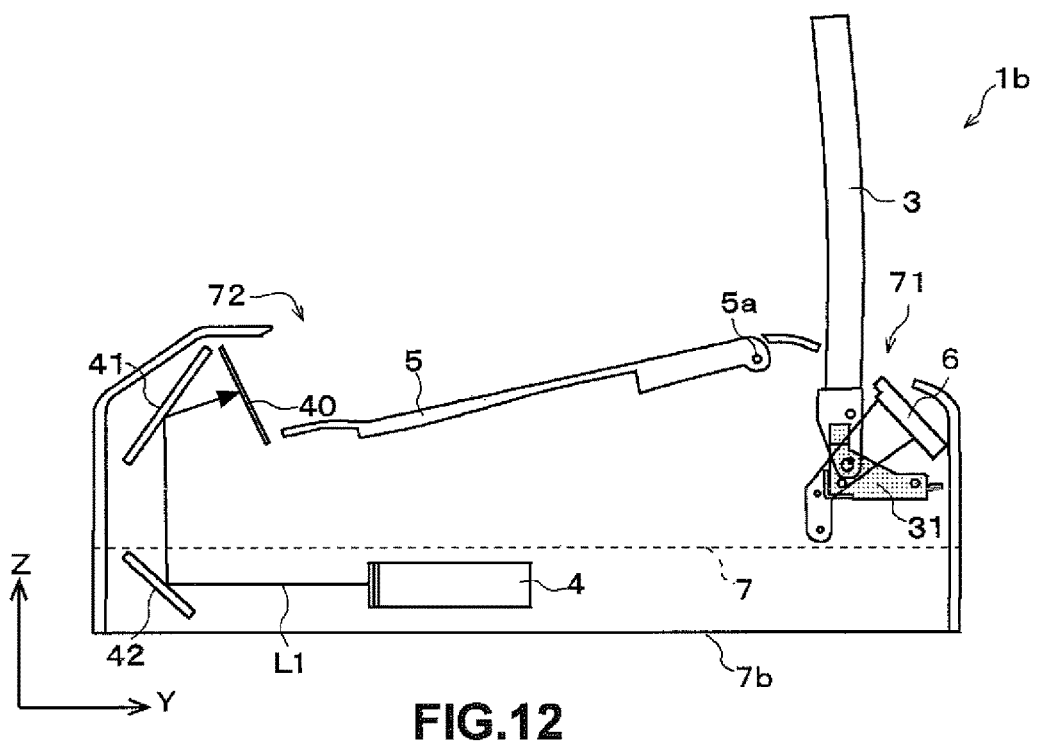
FIG. 12 shows a comparative example of the head-up display apparatus.

FIG. 11 and FIG. 12 show schematic configurations of a head-up display apparatus 1a and a head-up display apparatus 1b, respectively, that are comparative examples of the head-up display apparatus 1. In these head-up display apparatuses 1a and 1b, the projector 4 is not movable but is fixedly mounted.

As shown in FIG. 11, in a case where the projector 4 is placed such that an image is projected directly on the screen 40, a space is required in the front-rear direction (Y-axis direction) for a light path of the projection light L from the lens of the projector 4 to the screen 40. Thus, in comparison to the housing 7 of the embodiment, a housing 7a of the comparison example should be longer in the front-rear direction (Y-axis direction).

Further, as shown in FIG. 12, even in a case where the projector 4 is placed such that an image is projected on the screen 40 via the plurality of mirrors 41 and 42, since being fixedly mounted, the projector 4 cannot be moved to be placed in the storage space for the storage of the combiner 3. Thus, in comparison to the housing 7 of the embodiment, a housing 7b of the comparison example should be bigger in the up-down direction (Z-axis direction).

On the other hand, the head-up display apparatus 1 of the embodiment, the projector 4 is moved to the unused spaces in the non-use state ST1 and in the use state ST2. In other words, the projector 4 is moved to the light path space SP2 in the non-use state ST1, and the projector 4 is moved to the storage space SP1 in the use state ST2. Thus, the space in the housing 7 can be used efficiently and the head-up display apparatus 1 can be smaller.

<4. Driving Mechanism>

As described above, the combiner 3, the projector 4, the lid 5 and the shutter 6 of the head-up display apparatus 1 are moved. All of these combiner 3, projector 4, lid 5 and shutter 6 are moved by the driving mechanism 2 provided in the housing 7. The driving mechanism 2 is configured to move the slide chassis 31 in the front-rear direction (Y-axis direction) and the move of the slide chassis 31 causes all the combiner 3, the projector 4, the lid 5 and the shutter 6 to move. Accordingly, the driving mechanism 2 requires fewer driving sources. The driving mechanism 2 is hereinafter described in detail.

<4-1. Chassis Moving Mechanism>

Figure 13:
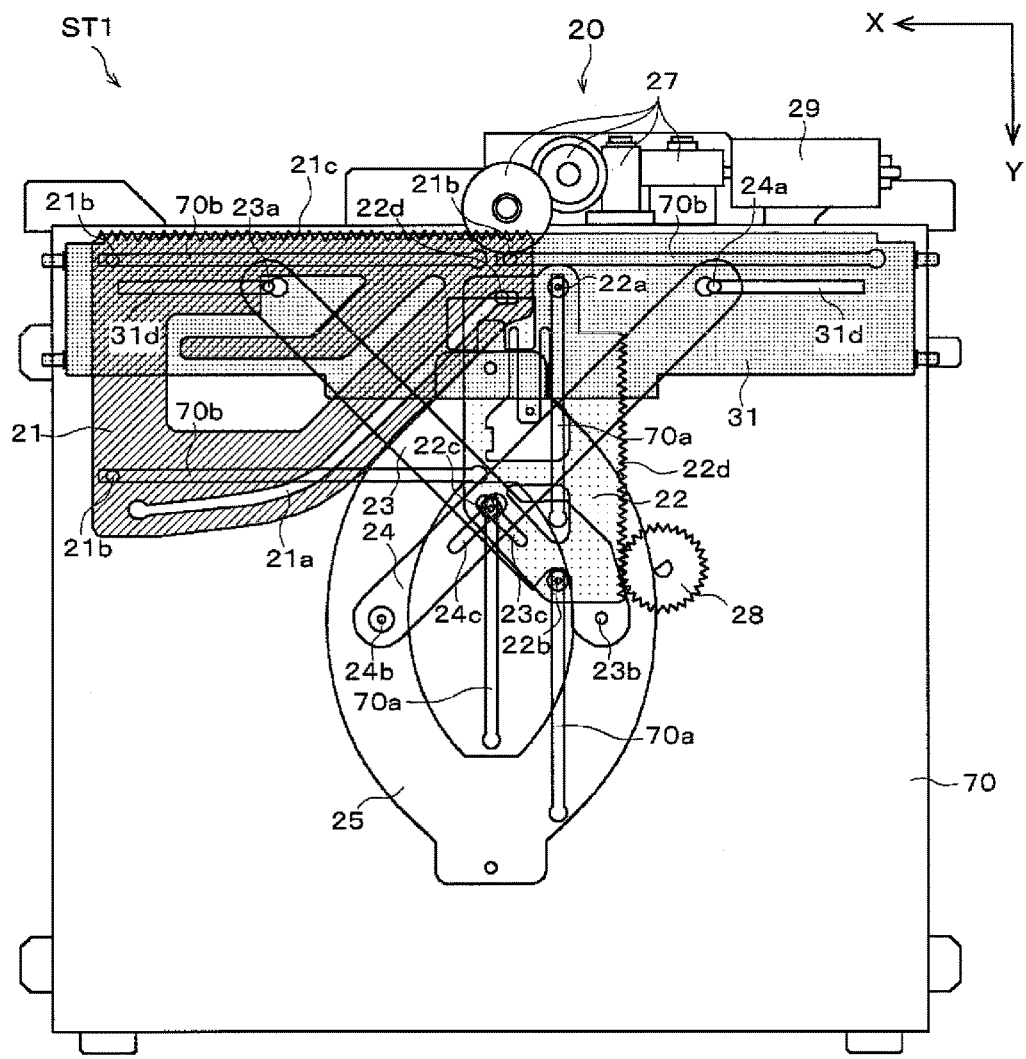
FIG. 13 shows a configuration of a chassis moving mechanism.
Figure 14:
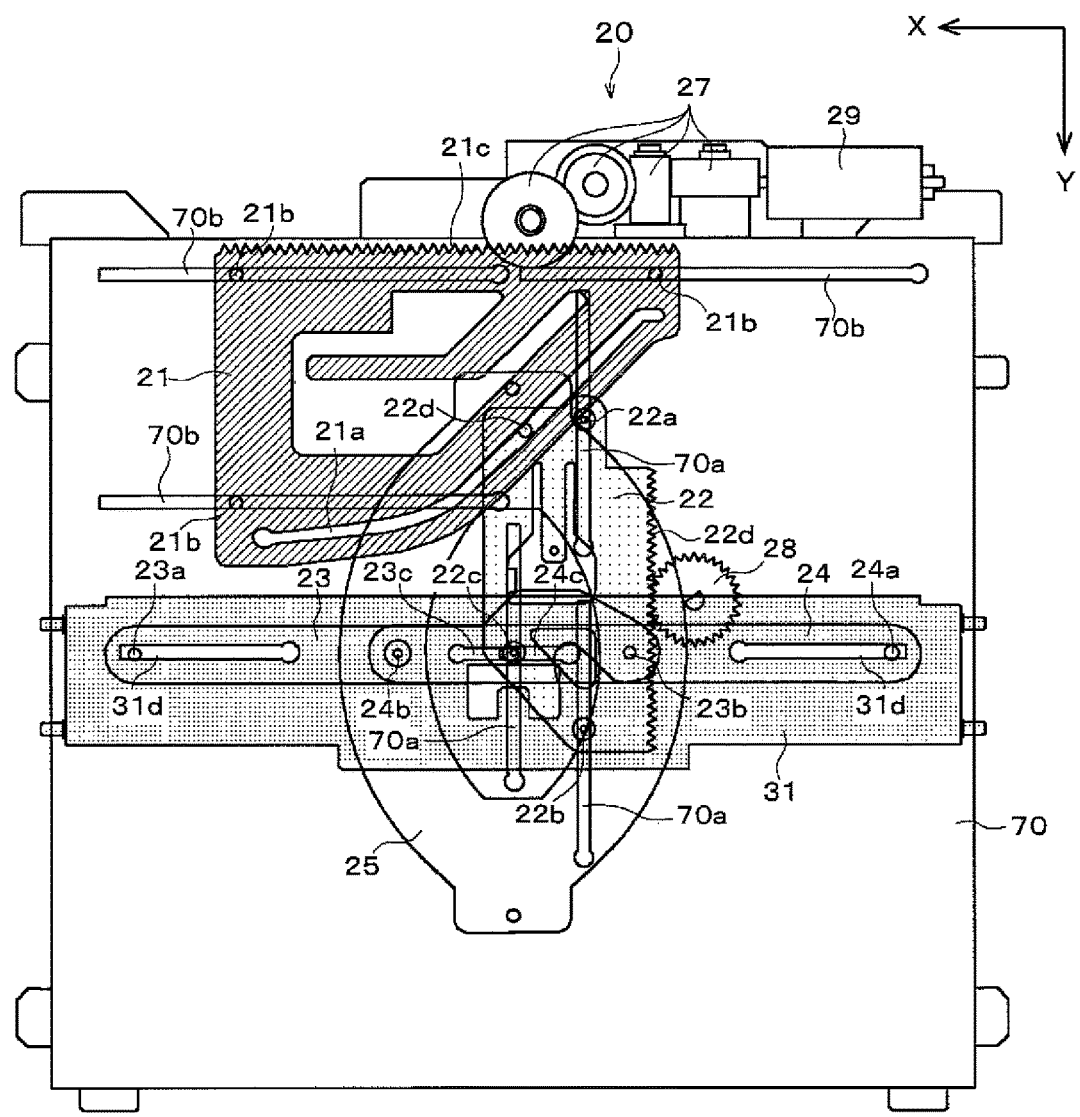
FIG. 14 shows a configuration of the chassis moving mechanism.
Figure 15:
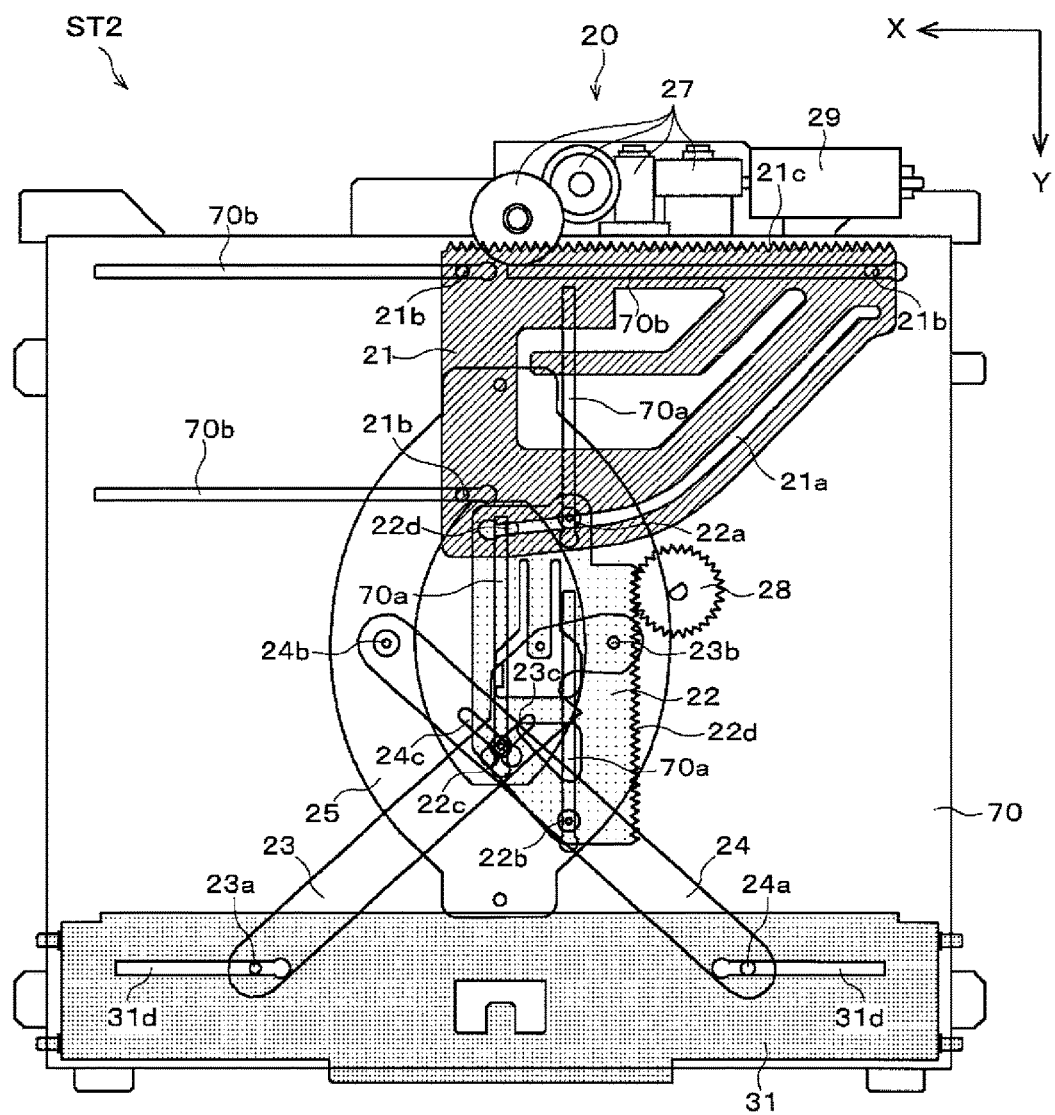
FIG. 15 shows a configuration of the chassis moving mechanism.

First described is a chassis moving mechanism configured to move the slide chassis 31 as a part of the driving mechanism 2. Each of FIG. 13 to FIG. 15 shows a configuration of a chassis moving mechanism 20 viewed from a lower side (−Z side) of the head-up display apparatus 1. An upper side and a lower side of the drawings are a rear side (−Y side) and a front side (+Y side) of the head-up display apparatus 1, respectively. FIG. 13 shows the head-up display apparatus 1 in the non-use state ST1. FIG. 15 shows the head-up display apparatus 1 in the use state ST2. Moreover, FIG. 14 shows a transitional state from the non-use state ST1 or the use state ST2 to the other state. In those drawings, a part of members are shown transparently and a configuration less relating to the chassis moving mechanism 20 is omitted, for easy explanation.

As shown in the drawings, the driving mechanism 2 includes a main chassis 70, a reference base member fixed to the housing 7. The chassis moving mechanism 20 is configured to move the slide chassis 31 linearly in the front-rear direction (Y-axis direction) relative to the main chassis 70. The chassis moving mechanism 20 is configured to move the slide chassis 31 linearly to a rear side (−Y side) of the main chassis 70 in the non-use state ST1 shown in FIG. 13. The chassis moving mechanism 20 is configured to move the slide chassis 31 to a front side (+Y side) of the main chassis 70 in the use state ST2 shown in FIG. 15.

The chassis moving mechanism 20 includes a left-right slide lever 21 and a front-rear slide lever 22, both of which move linearly relative to the main chassis 70. A bottom surface of the main chassis 70 is a part of the chassis moving mechanism 20.

The left-right slide lever 21 includes three shafts 21b. The three shafts 21b are fitted into three guide grooves 70b extending in the left-right direction (X-axis direction) on the bottom surface of the main chassis 70. Therefore, the left-right slide lever 21 is movable, relative to the main chassis 70, in the left-right direction (X-axis direction) along the three guide grooves 70b.

The front-rear slide lever 22 includes three shafts 22a, 22b and 22c. The three shafts 22a, 22b and 22c are fitted into three guide grooves 70a extending in the front-rear direction (Y-axis direction) on the bottom surface of the main chassis 70. Thus, the front-rear slide lever 22 is movable, relative to the main chassis 70, in the front-rear direction (Y-axis direction) along the three guide grooves 70a.

Moreover, the left-right slide lever 21 includes a guide groove 21a. The entire guide groove 21a is inclined in the left-right direction (X-axis direction). An interlocking shaft 22d included in the front-rear slide lever 22 is fitted into the guide groove 21a.

Moreover, the chassis moving mechanism 20 includes bar-like link levers 23 and 24 that are provided such that the link levers 23 and 24 intersect each other.

The first link lever 23 includes a rotation axis 23b on one end. The first link lever 23 is rotatably connected to the bottom surface of the main chassis 70 via the rotation axis 23b and rotates around a point on a right side (−X side) of a center of the bottom surface of the main chassis 70. Moreover, the first link lever 23 includes an action shaft 23a on the other end thereof. The action shaft 23a is fitted into a guide groove 31d extending in the left-right direction (X-axis direction) on a left side (+X side) of the slide chassis 31.

Moreover, the first link lever 23 includes a guide groove 23c near a point at which the first link lever 23 intersects with the second link lever 24. The guide groove 23c runs in the direction in which the first link lever 23 extends, and a shaft 22c (hereinafter referred to as "center shaft") of the front-rear slide lever 22 is fitted into the guide groove 23c.

Further, the second link lever 24 includes a rotation axis 24b on one end. The second link lever 24 is rotatably connected to a plate 25 fixed to the main chassis 70 via the rotation axis 24b and rotates around a point on a left side (+X side) of the center of the bottom surface of the main chassis 70. Moreover, the second link lever 24 includes an action shaft 24a on the other end thereof. The action shaft 24a is fitted into the guide groove 31d extending in the left-right direction (X-axis direction) on a right side (−X side) of the slide chassis 31.

Moreover, the second link lever 24 includes a guide groove 24c near a point at which the first link lever 23 intersects with the second link lever 24. The guide groove 24c runs in the direction in which the second link lever 24 extends and the center shaft 22*c* of the front-rear slide lever 22 is fitted into the guide groove 24*c*.

Therefore, the center shaft 22*c* of the front-rear slide lever 22 is fitted into all of the guide groove 70*a* of the main chassis 70, the guide groove 23*c* of the first link lever 23 and the guide groove 24*c* of the second link lever 24.

When the left-right slide lever 21 moves in the left-right direction (X-axis direction), the interlocking shaft 22*d* of the front-rear slide lever 22 moves along the guide groove 21*a*. The move of the interlocking shaft 22*d* causes the front-rear slide lever 22 to move in the front-rear direction (Y-axis direction).

When the front-rear slide lever 22 moves in the front-rear direction (Y-axis direction), the center shaft 22*c* of the front-rear slide lever 22 also moves in the front-rear direction (Y-axis direction). When the center shaft 22*c* moves in the front-rear direction (Y-axis direction), the center shaft 22*c* pushes a side of each of the two guide grooves 23*c* and 24*c* and then the two link levers 23 and 24 rotate along the main chassis 70.

When both of the two link levers 23 and 24 rotate, the action shafts 23*a* and 24*a* move along the two guide grooves 31*d* on the slide chassis 31, respectively. During the move, the action shafts 23*a* and 24*a* push sides of the two guide grooves 31*d*, respectively, and the slide chassis 31 moves in the front-rear direction (Y-axis direction).

For example, when the left-right slide lever 21 moves rightward (−X side) from the non-use state ST1 shown in FIG. 13, the interlocking shaft 22*d* of the front-rear slide lever 22 moves forward (+Y side) along the guide groove 21*a*, as shown in FIG. 14. Thus, the front-rear slide lever 22 also moves forward (+Y side). The move of the front-rear slide lever 22 causes the center shaft 22*c* to push both of the two link levers 23 and 24 forward (+Y side). The first link lever 23 rotates around the rotation axis 23*b* counterclockwise in the drawing, and the second link lever 24 rotates around the rotation axis 24*b* clockwise in the drawing. The rotation of the two link levers 23 and 24 causes the action shafts 23*a* and 24*a* to move along the guide groove 31*d* while pushing the slide chassis 31 forward (+Y side). Thus, the slide chassis 31 moves forward (+Y side).

When the left-right slide lever 21 moves further rightward (−X side) from the state shown in FIG. 14, the front-rear slide lever 22 moves further forward (+Y side). The move of the front-rear slide lever 22 causes the center shaft 22*c* to push the two link levers 23 and 24 further forward (+Y side). Thus, the two link levers 23 and 24 further rotate. The rotation of the link levers 23 and 24 causes the action shafts 23*a* and 24*a* to push the slide chassis 31 further forward (+Y side). Accordingly, the slide chassis 31 moves to the front side (+Y side) of the main chassis 70, as shown in FIG. 15, and the head-up display apparatus 1 is changed to the use state ST2.

Contrarily, when the left-right slide lever 21 moves leftward (+X side) from the use state ST2 shown in FIG. 15, each element of the chassis moving mechanism 20 performs reverse move as compared to the foregoing move. As a result, the slide chassis 31 moves to the rear side (−Y side) of the main chassis 70, and the head-up display apparatus 1 is changed to the non-use state ST1 shown in FIG. 13.

Further, as shown in FIG. 13 to FIG. 15, a degree of an inclination of the guide groove 21*a* of the left-right slide lever 21 relative to the left-right direction (X-axis direction) is less on a left side (+X side) than on a right side (−X side). When the slide chassis 31 is located on the rear side (−Y side) of the main chassis 70, the interlocking shaft 22*d* moves on a right side of the guide groove 21*a*. When the slide chassis 31 is located on the front side (+Y side) of the main chassis 70, the interlocking shaft 22*d* moves on a left side (+X side) of the guide groove 21*a*. Therefore, when the slide chassis 31 is located on the front side (+Y side) of the main chassis 70, the slide chassis 31 moves faster than when the slide chassis 31 is located on the rear side (−Y side) of the main chassis 70.

Further, the chassis moving mechanism 20 includes a motor 29 that serves as a driving source by generating driving force and a plurality of gears 27 that delivers the driving force generated by the motor 29. The motor 29 and the plurality of gears 27 are provided on the rear side (−Y side) of the main chassis 70. One of the plurality of gears 27 is engaged with a rack gear 21*c* that is provided on the left-right slide lever 21. Thus, the driving force generated by the motor 29 is delivered to the left-right slide lever 21 via the plurality of gears 27. When the motor 29 rotates, the left-right slide lever 21 moves along the three guide grooves 70*b* in the left-right direction (X-axis direction). The rotation of the motor 29 is controlled by the controller 10 (refer to FIG. 6).

Further, the chassis moving mechanism 20 includes a position sensor 28 that detects a position of the front-rear slide lever 22. The position sensor 28 is, for example, a rotary encoder that detects a rotation angle and is provided to the bottom surface of the main chassis 70. The position sensor 28 is engaged with the rack gear 21*c* provided to the front-rear slide lever 22. Thus, the position sensor 28 can detect the position of the front-rear slide lever 22.

The position sensor 28 outputs to the controller 10 a detection result that shows the position of the front-rear slide lever 22. As described above, the combiner 3 moves in tandem with the slide chassis 31. Thus, the detection result detected by the position sensor 28 shows an actual state of the combiner 3. The controller 10 adjusts a position and an angle of the combiner 3 by rotating the motor 29 based on the detection result detected by the position sensor 28.

<4-2. Combiner Moving Mechanism>

Next explained is a combiner moving mechanism configured to move the combiner 3 between the use position and the storage position as a part of the driving mechanism 2. As described above, the combiner 3 is connected to and moves in tandem with the slide chassis 31 serving as a slider member that moves in the horizontal direction.

Figure 16:
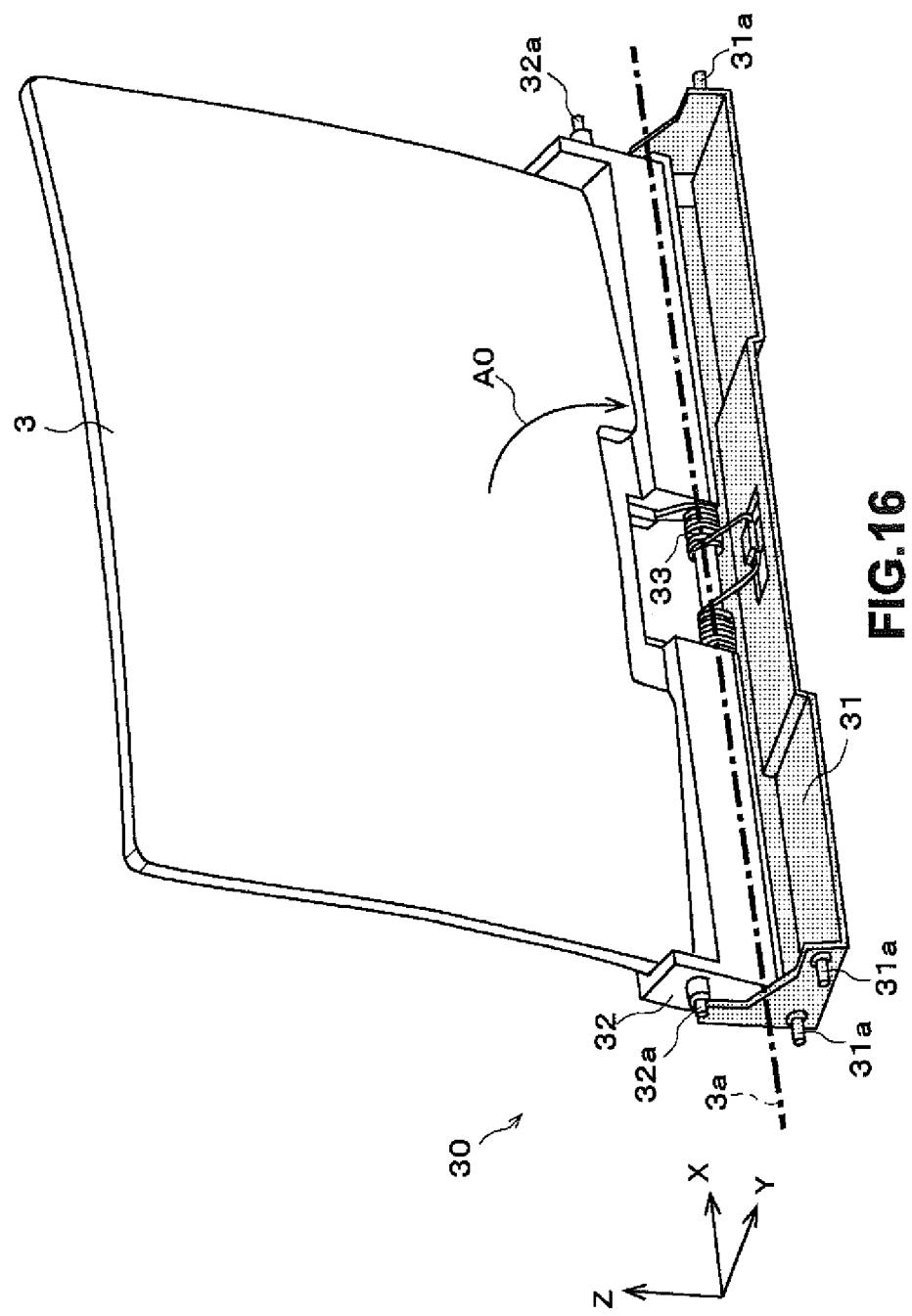
FIG. 16 shows a key configuration of a combiner moving mechanism.

FIG. 16 shows a key configuration of a combiner moving mechanism 30. As shown in FIG. 16, the combiner moving mechanism 30 includes a combiner holder 32 serving as a holder member that holds the combiner 3. Moreover, the slide chassis 31 is a part of the combiner moving mechanism 30.

The combiner holder 32 is fixed to a lower portion of the combiner 3 and holds the combiner 3. Moreover, a lower portion of the combiner holder 32 is connected to the slide chassis 31 such that the combiner holder 32 is rotatable around a rotation axis 3*a* extending in the left-right direction (X-axis direction). Thus, the combiner 3 held by the combiner holder 32 is rotatable around the rotation axis 3*a* to the slide chassis 31.

Further, a coil spring 33, serving as a pushing force providing member, is provided to a center portion in the left-right direction of the combiner holder 32 and is attached to and pushes the combiner holder 32 and the slide chassis 31. When the slide chassis 31 is fixed, the coil spring 33 pushes the combiner holder 32 and the slide chassis 31 such that the combiner holder 32 is inclined to a direction (direction shown by an arrow A0) with an upper portion thereof inclined forward (+Y side).

Two slide shafts 31a extending in the left-right direction (X-axis direction) are provided to each of left and right end portions of the slide chassis 31. On the other hand, one slide shaft 32a extending in the left-right direction (X-axis direction) is provided to each of left and right end portions of the combiner holder 32.

Figure 17:
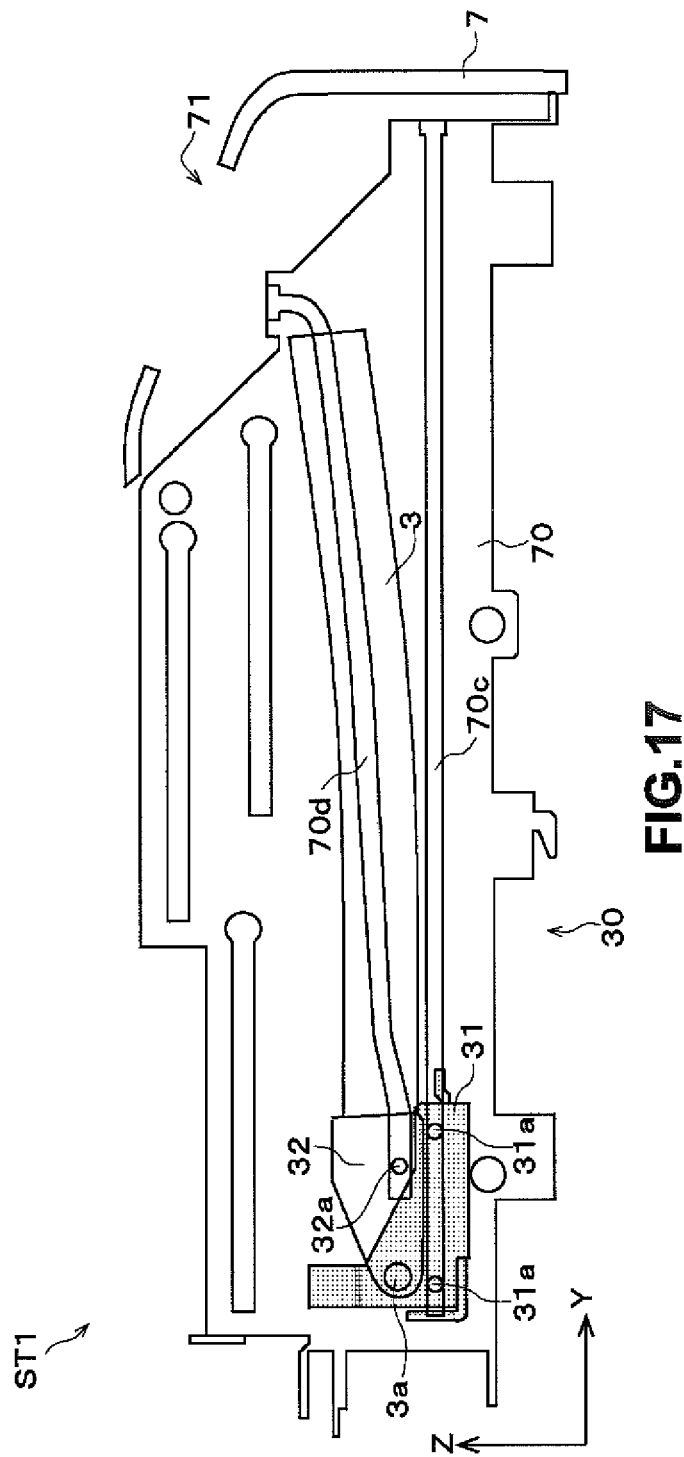
FIG. 17 shows a configuration of the combiner moving mechanism.
Figure 18:
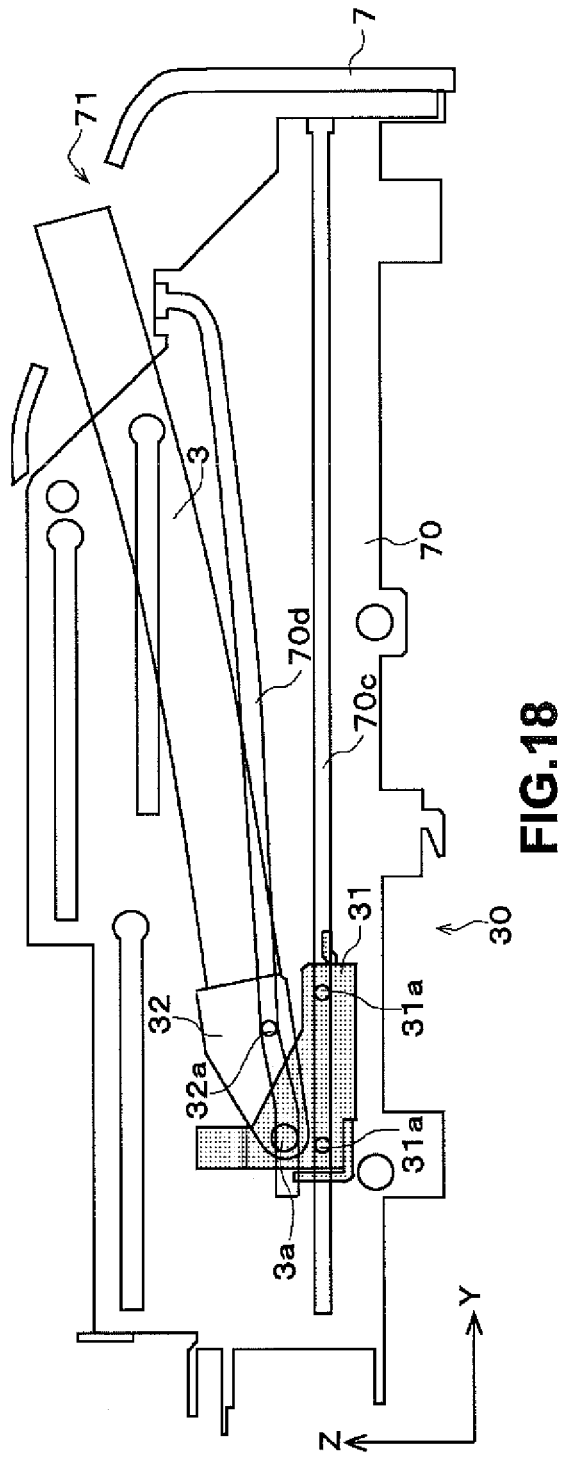
FIG. 18 shows a configuration of the combiner moving mechanism.
Figure 19:
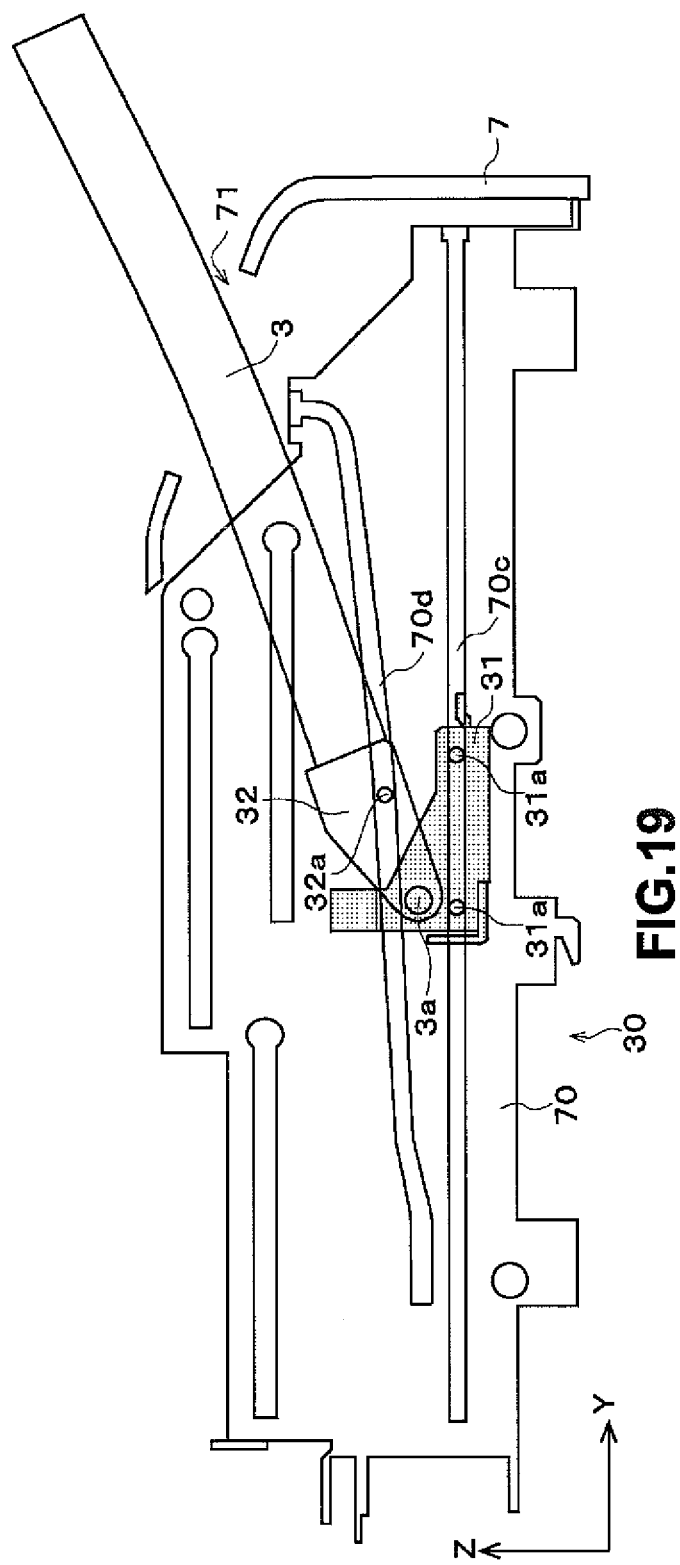
FIG. 19 shows a configuration of the combiner moving mechanism.
Figure 20:
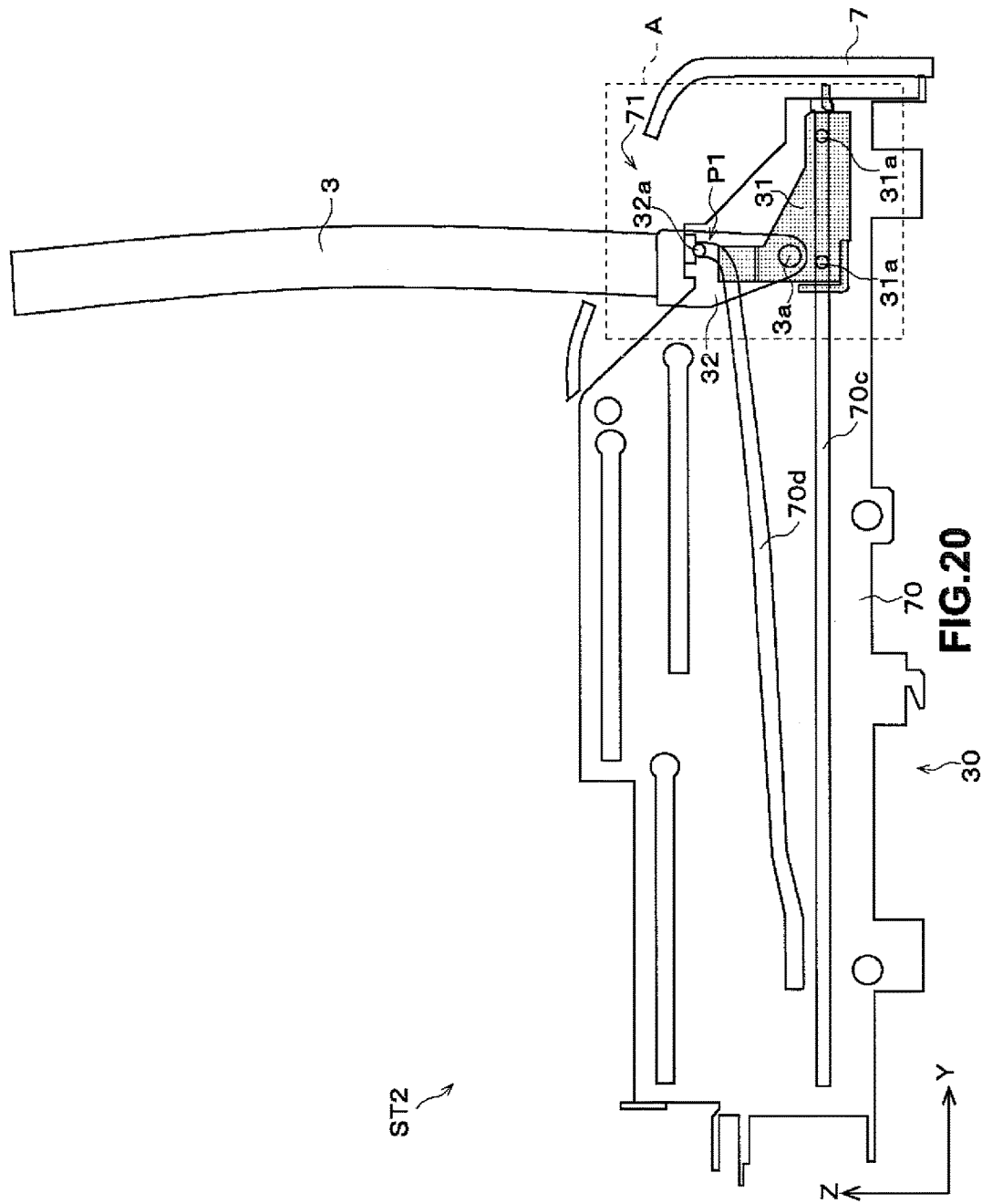
FIG. 20 shows a configuration of the combiner moving mechanism.

Each of FIG. 17 to FIG. 20 shows a configuration of the combiner moving mechanism 30 viewed from the right side (−X side) of the head-up display apparatus 1. FIG. 17 shows the non-use state ST1 and FIG. 20 shows the use state ST2. Moreover, each of FIG. 18 and FIG. 19 shows a transitional state from the non-use state ST1 or the use state ST2 to the other state.

In those drawings, a part of members are shown transparently and a configuration less relating to the combiner moving mechanism 30 is omitted, for easy explanation. As for the housing 7, only a partial portion near the first opening 71 is illustrated in the drawings. Each of FIG. 17 to FIG. 20 shows a configuration of the combiner moving mechanism 30 viewed from the right side (−X side) of the head-up display apparatus 1, and a configuration of the combiner moving mechanism 30 viewed from a left side (+X side) is mirror reversed to the configuration viewed from the right side (−X side).

A side surface extending in the left-right direction (X-axis direction) of the main chassis 70 serves as a part of the combiner moving mechanism 30. As shown in the drawings, both of the two slide shafts 31a on the end portions of the slide chassis 31 are fitted into a first guide groove 70c provided to the side surface of the main chassis 70. On the other hand, the slide shafts 31a on one end portion of the combiner holder 32 is fitted into a second guide groove 70d provided to a portion higher (+Z side) than the first guide groove 70c on the side surface of the main chassis 70. The first guide groove 70c runs linearly in the horizontal direction (front-rear direction). On the other hand, the second guide groove 70d is inclined relative to the horizontal direction such that a front portion (+Y side) of the second guide groove 70d is higher than a rear portion thereof.

The slide shafts 31a of the slide chassis 31 move along the first guide groove 70c in the front-rear direction (Y-axis direction), keeping the slide shafts 31a at a constant height. Thus, the slide chassis 31 moves linearly in the horizontal direction. On the other hand, the slide shaft 32a of the combiner holder 32 moves along the inclined second guide groove 70d, changing the height of the slide shaft 32a.

As described above, the combiner holder 32 that holds the combiner 3 is rotatably connected to the slide chassis 31 and is rotatable around the rotation axis 3a. Thus, when a position of the slide shaft 32a of the combiner holder 32 relative to the slide shafts 31a of the slide chassis 31 is changed, the combiner 3 rotates around the rotation axis 3a and the angle of the combiner 3 to the horizontal direction is changed.

As the slide shaft 32a of the combiner holder 32 moves forward (+Y side), the height of the slide shaft 32a becomes higher. Thus, as the slide shaft 32a of the combiner holder 32 moves forward (+Y side), the slide shaft 32a moves away from the slide shafts 31a of the slide chassis 31. Therefore, as the slide shaft 32a moves forward (+Y side), the combiner 3 rotates counterclockwise in the drawings and is changed to a standing position.

Due to the configuration described above, the combiner can change the angle of the combiner 3 to the horizontal direction while moving the rotation axis 3a provided to the lower portion of the combiner 3, in the horizontal direction. The combiner moving mechanism 30 is configured to change the angle of the combiner 3 relative to the horizontal direction such that the more forward (+Y side) the combiner moving mechanism 30 moves the combiner 3, the more vertically the combiner 3 stands.

In the non-use state ST1 shown in FIG. 17, the entire combiner 3 is stored in a lying posture in the storage position. When the slide chassis 31 moves forward (+Y side) from the non-use state ST1 show in FIG. 17, the slide shaft 32a of the combiner holder 32 also moves forward (+Y side). The slide shaft 32a of the combiner holder 32 moves gradually higher and forward (+Y side) along the second guide groove 70d, as shown in FIG. 18 and FIG. 19. Thus, the combiner 3 rotates counterclockwise in the drawing, gradually elevating a tip portion, and moves forward (+Y side), changing the angle to the horizontal direction.

As the slide chassis 31 moves further forward (+Y side) from the state shown in FIG. 19, the slide shaft 32a of the combiner holder 32 is elevated further along the second guide groove 70d. Thus, as shown in FIG. 20, the combiner 3 is placed in the use position, standing from the first opening 71, and the head-up display apparatus 1 is changed to the use state ST2.

Contrarily, when the slide chassis 31 moves rearward (−Y side) from the use state ST2 shown in FIG. 20, each function of the combiner moving mechanism 30 performs reverse move as compared to the foregoing move. As a result, the combiner 3 moves to the storage position and the head-up display apparatus 1 is changed to the non-use state ST1 shown in FIG. 13.

As described above, since the combiner moving mechanism 30 is configured to change the angle of the combiner 3 to the horizontal direction while moving the combiner 3 in the horizontal direction, a trajectory of the tip portion of the combiner 3 can be smaller.

Figure 21:
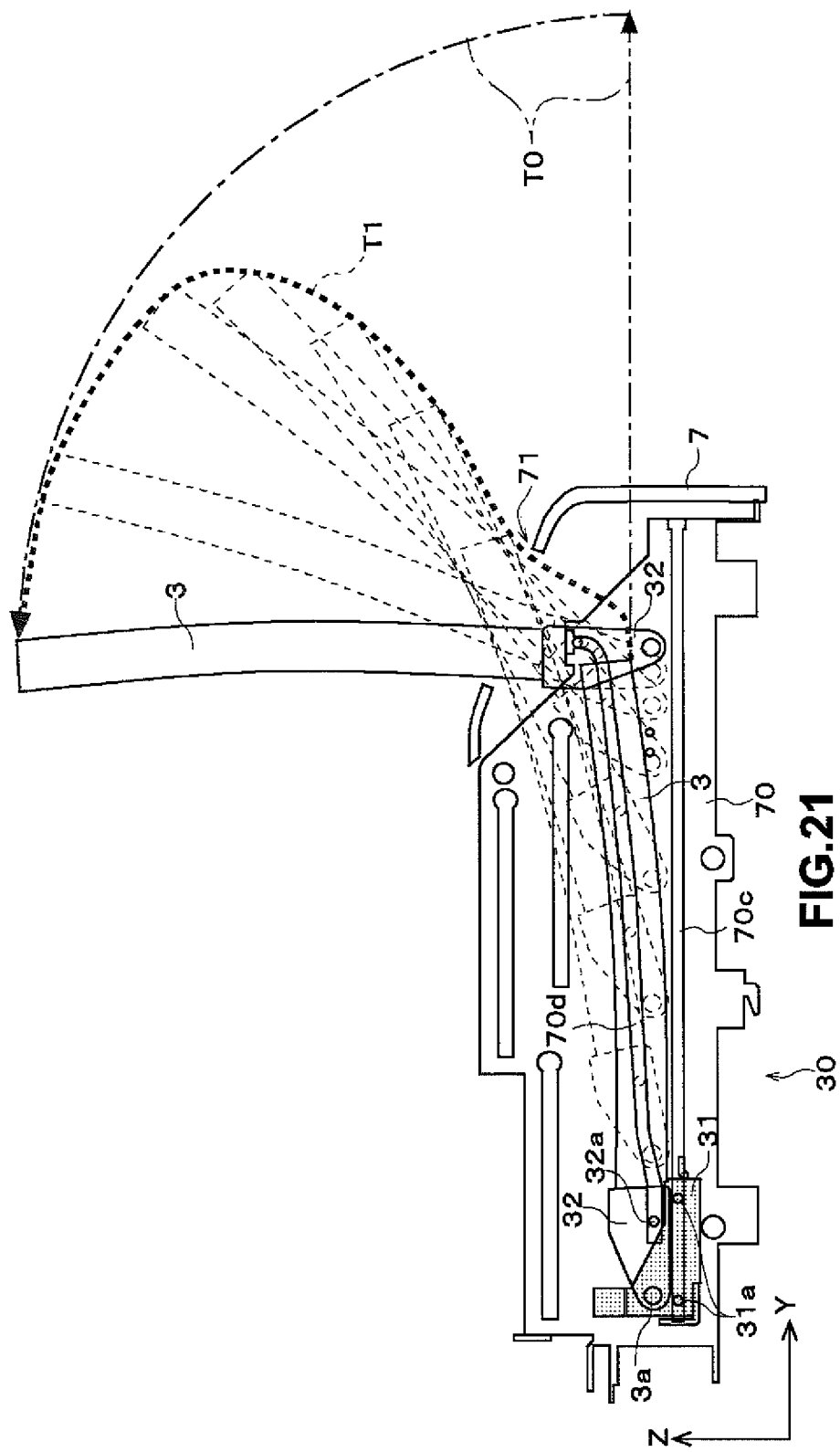
FIG. 21 shows a trajectory of an end portion of a combiner.

FIG. 21 shows a moving trajectory of the tip portion of the combiner 3 moving from the storage position to the use position. A dashed line in the drawing shows a moving trajectory T1 of the tip portion of the combiner 3 provided to the head-up display apparatus 1 in the embodiment.

On the other hand, a dashed-dotted line in the FIG. 21 shows a moving trajectory T0 of the tip portion of the combiner 3 as a comparative example, in a case where the combiner 3 is rotated to stand after being moved forward (+Y side) to be moved completely out of the housing 7 in the laying posture. As shown by the moving trajectory T0, in a case of the comparative example, the combiner 3 moves largely to the front side (+Y side) of the head-up display apparatus 1. Therefore, if a front windshield, etc. of the vehicle is located in front of the head-up display apparatus 1, the combiner 3 may make contact with the front windshield. Moreover, the first opening 71 formed on the housing 7 needs to be large.

On the other hand, in the head-up display apparatus 1 in this embodiment, the combiner moving mechanism 30 is configured to change the angle of the combiner 3 to the horizontal direction while changing the position of combiner 3 in the horizontal direction. Thus, as shown by the moving trajectory T1, an area necessary for the tip portion of the combiner 3 to move in front (+Y side) of the head-up display apparatus 1 can be smaller. Thus, it is possible to reduce the area necessary in front of the head-up display apparatus 1 to prevent the combiner 3 from making contact with another object. Thus, it is possible to improve a degree of freedom of a location where the head-up display apparatus 1 is mounted. Moreover, the first opening 71 formed on the housing 7 can be smaller.

The combiner moving mechanism 30 is configured to adjust the angle of the reflective surface of the combiner 3 relative to the horizontal direction in the use state ST2 shown in FIG. 20. A degree of an inclination of the second guide groove 70d to the horizontal direction becomes greater drastically near an end portion P1 on a front (+Y side) (hereinafter referred to as "front end portion"). The second guide groove 70d runs substantially in the up-down direction (Z-axis direction) on the front end portion P1.

As shown in FIG. 20, the slide shaft 32a of the combiner holder 32 is located at the front end portion P1 of the second guide groove 70d in the use state ST2. Thus, even if the slide chassis 31 is moved in the front-rear direction (Y-axis direction) in the use state ST2, the slide shaft 32a of the combiner holder 32 does not move much in the front-rear direction. Therefore, when the slide chassis 31 is moved slightly in the front-rear direction (Y-axis direction) in the use state ST2, it is possible to change the angle of the combiner 3 slightly relative to the horizontal direction without changing the position of the combiner 3 in the front-rear direction (Y-axis direction). Due to the configuration describe above, the combiner moving mechanism 30 can adjust the angle of the reflective surface of the combiner 3 in the use state ST2 by a control performed by the controller 10 (refer to FIG. 6).

Moreover, as described above, the coil spring 33 that pushes the combiner holder 32 and the slide chassis 31 is provided to the center portion in the left-right direction of the combiner holder 32 (refer to FIG. 16). The coil spring 33 pushes the slide shafts 31a of the slide chassis 31 toward the second guide groove 70d (upward) and pushes the slide shaft 32a of the combiner holder 32 toward the first guide groove 70c (downward). Thus, force to become closer to each other is given to the slide shafts 31a and the slide shaft 32a, and a part of the main chassis 70 (between the first guide groove 70c and the second guide groove 70d) is pinched. Thus, a posture of the combiner 3 is stable and it is possible to prevent rattle of the combiner 3 during move of the combiner 3.

Figure 22:
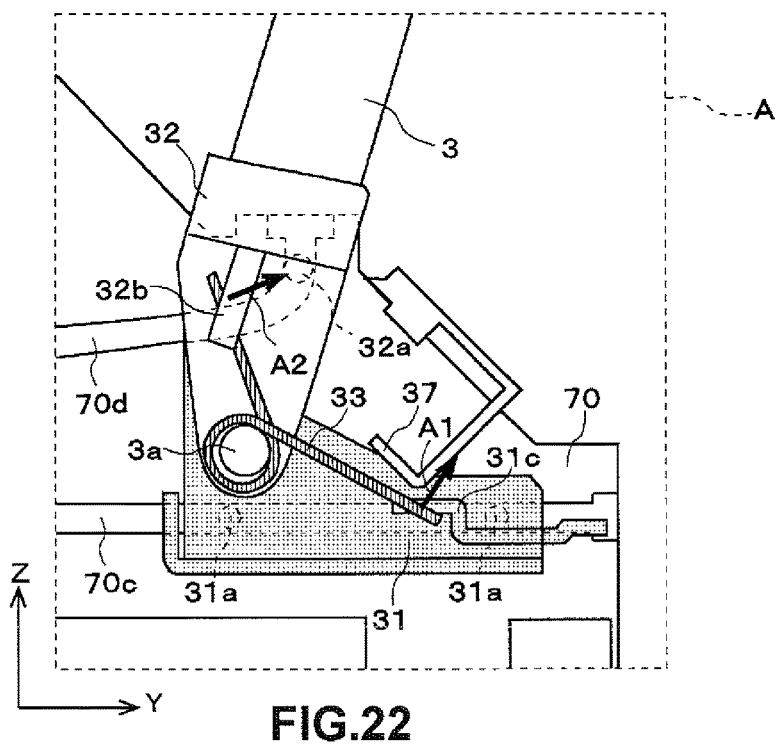
FIG. 22 shows an enlarged view of an area near a coil spring.
Figure 23:
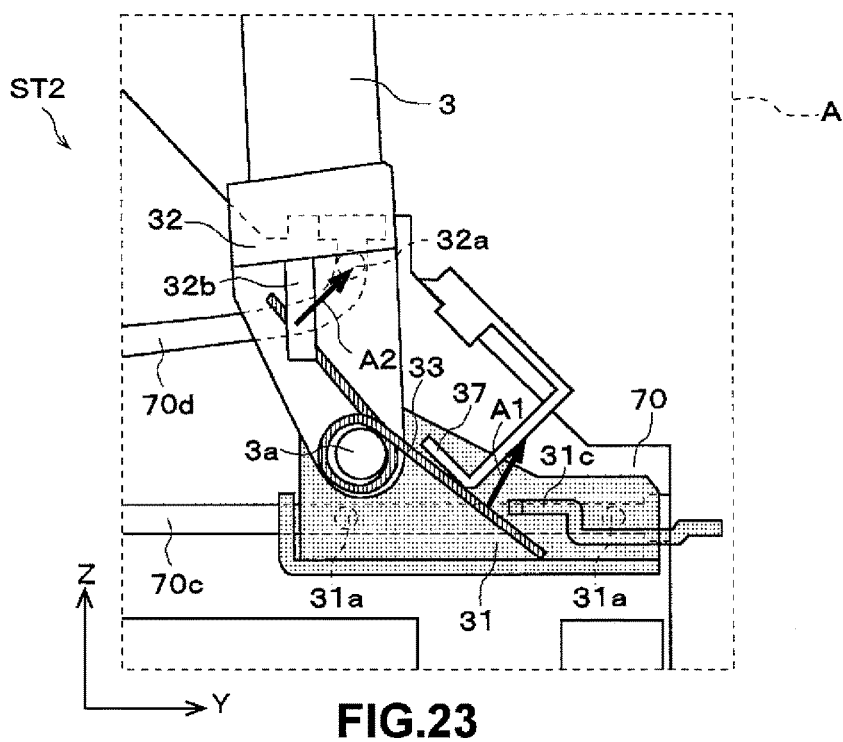
FIG. 23 shows an enlarged view of the area near the coil spring.

The force provided by the coil spring 33 becomes large in the use state ST2 and the posture of the combiner 3 becomes more stable. Each of FIG. 22 and FIG. 23 shows an enlarged view showing an area (corresponding to a region A shown in FIG. 20) near the coil spring 33. FIG. 22 shows a state immediately before a transition to the use state ST2, and FIG. 23 shows the use state ST2.

As shown in FIG. 22, one end of the coil spring 33 is engaged with an engagement nail 31c of the slide chassis 31 in a state other than the use state ST2 and pushes the slide chassis 31 in a direction shown by an arrow A1 in FIG. 22. Moreover, the other end of the coil spring 33 is engaged with an engagement portion 32b of the combiner holder 32 and pushes the combiner holder 32 in a direction shown by an arrow A2 in FIG. 22. When the slide chassis 31 moves forward (+Y side) from the state shown in FIG. 22, the coil spring 33 is changed to a state shown in FIG. 23 and the head-up display apparatus 1 is changed to the use state ST2.

As shown in FIG. 23, in the use state ST2, a touching part 37 fixed to the main chassis 70 touches the one end of the coil spring 33 from the front side (+Y side). Thus, the end of the coil spring 33 is released from the engagement nail 31c of the slide chassis 31. The touching part 37 touches the coil spring 33, resisting pushing force of the coil spring 33. Therefore, the pushing force of the coil spring 33 increases. As a result, the posture of the combiner 3 in the use position is stabilized.

Moreover, in the transition to the use state ST2, the slide chassis 31 needs to be moved by relatively large force in order to increase the pushing force of the coil spring 33. As described above, when the slide chassis 31 is located on the front side (+Y side) of the main chassis 70, a moving speed of the slide chassis 31 decreases so that it is possible to move the slide chassis 31 by the relatively large force.

<4-3. Lid Moving Mechanism>

Next explained is a lid moving mechanism configured to move the lid 5 as a part of the driving mechanism 2. Since the projector 4 moves along with the lid 5, the lid moving mechanism is also regarded as a moving mechanism configured to move the projector 4.

Figure 24:
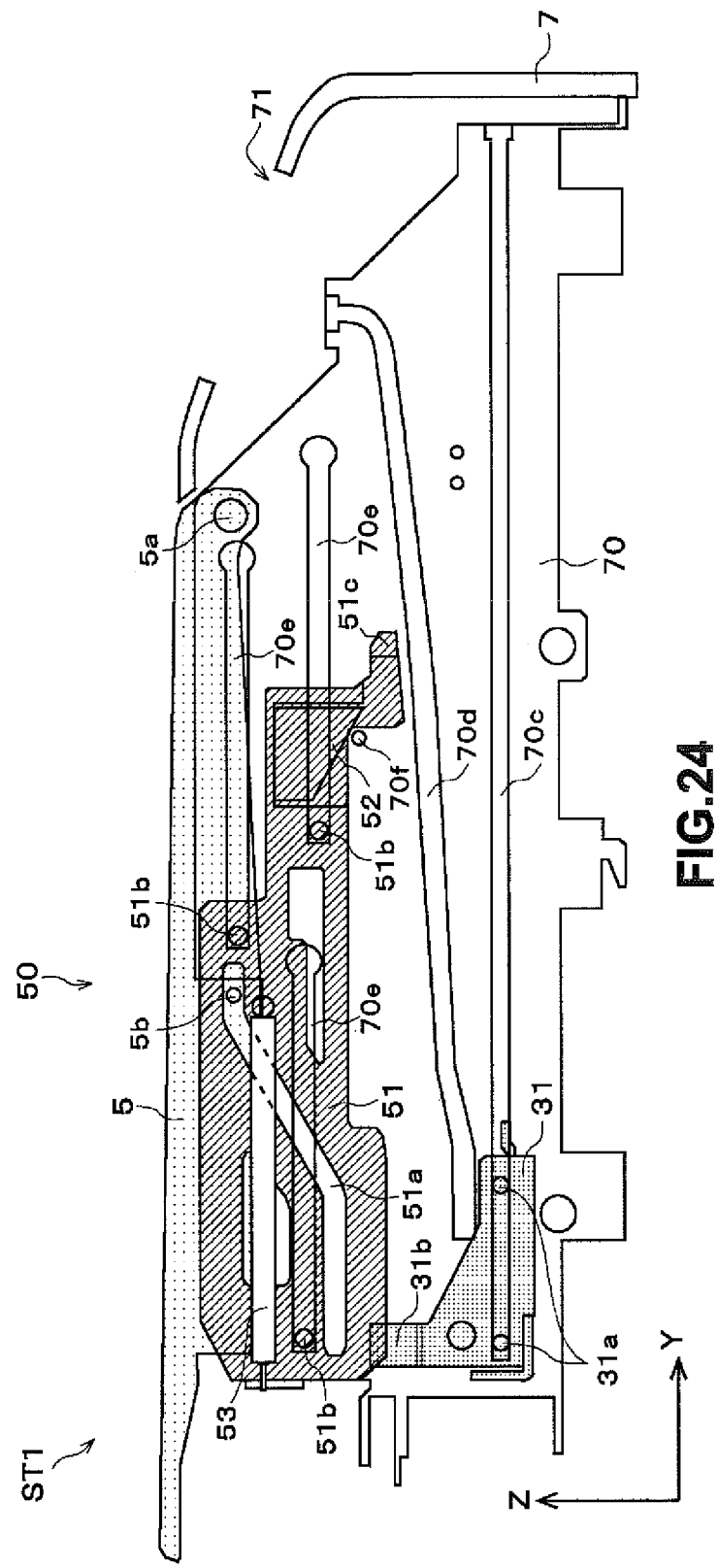
FIG. 24 shows a configuration of a lid moving mechanism.
Figure 25:
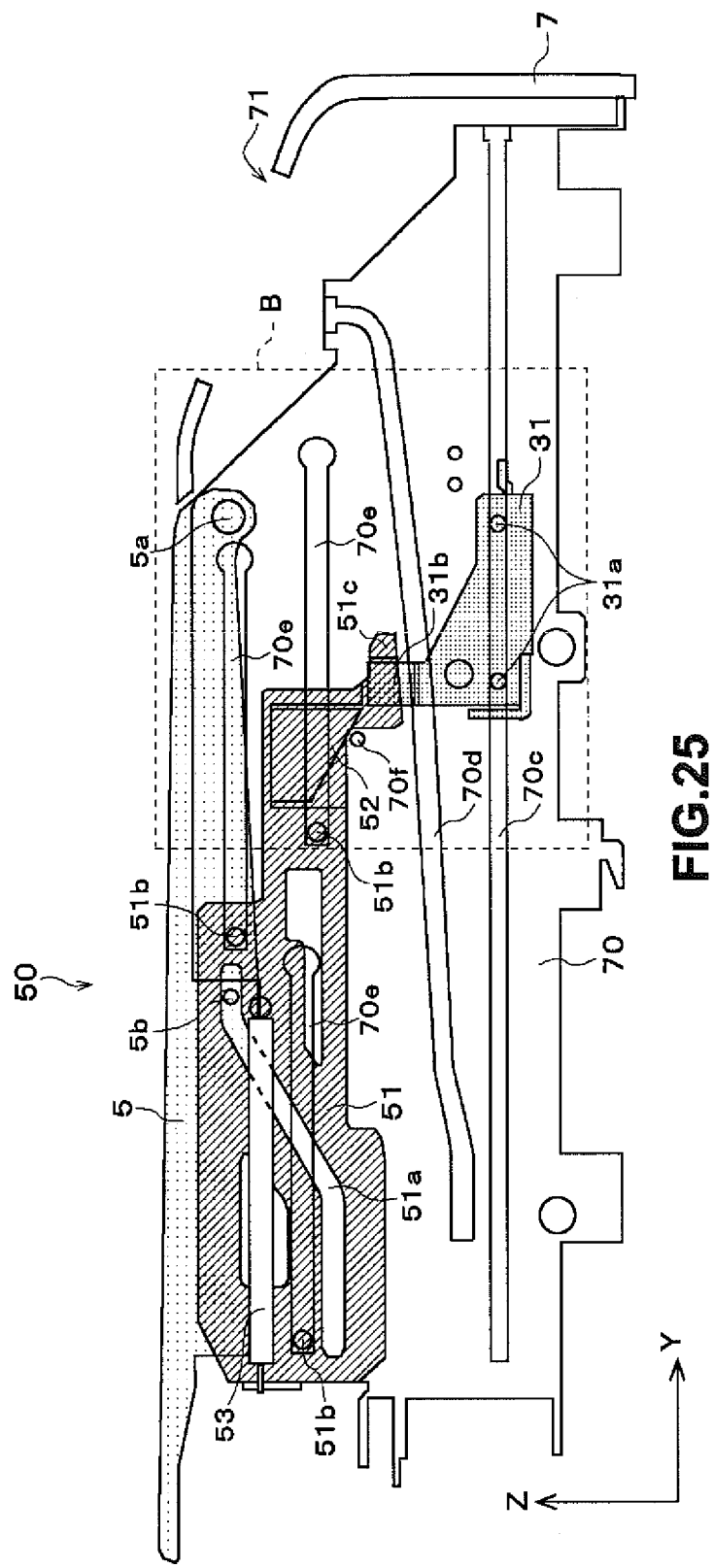
FIG. 25 shows a configuration of the lid moving mechanism.
Figure 26:
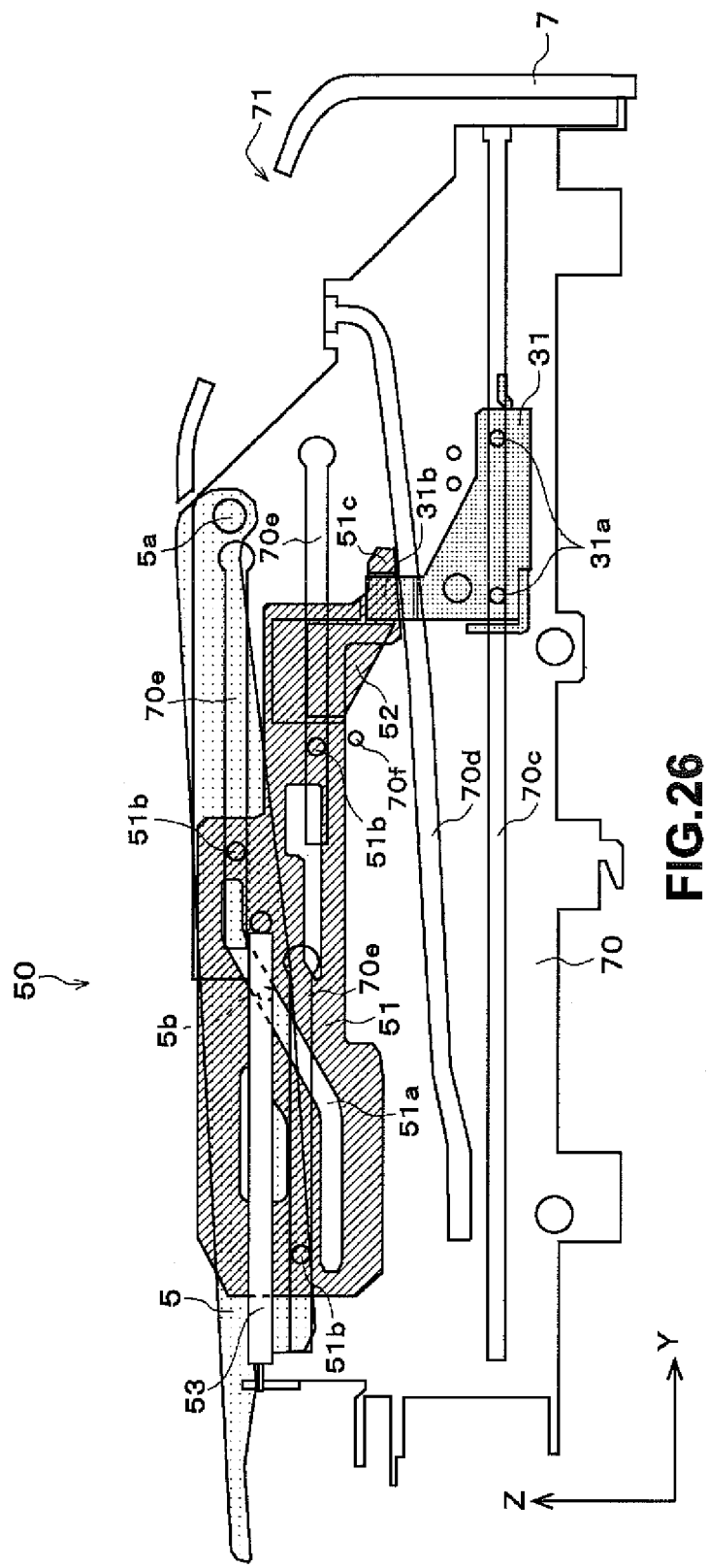
FIG. 26 shows a configuration of the lid moving mechanism.
Figure 27:
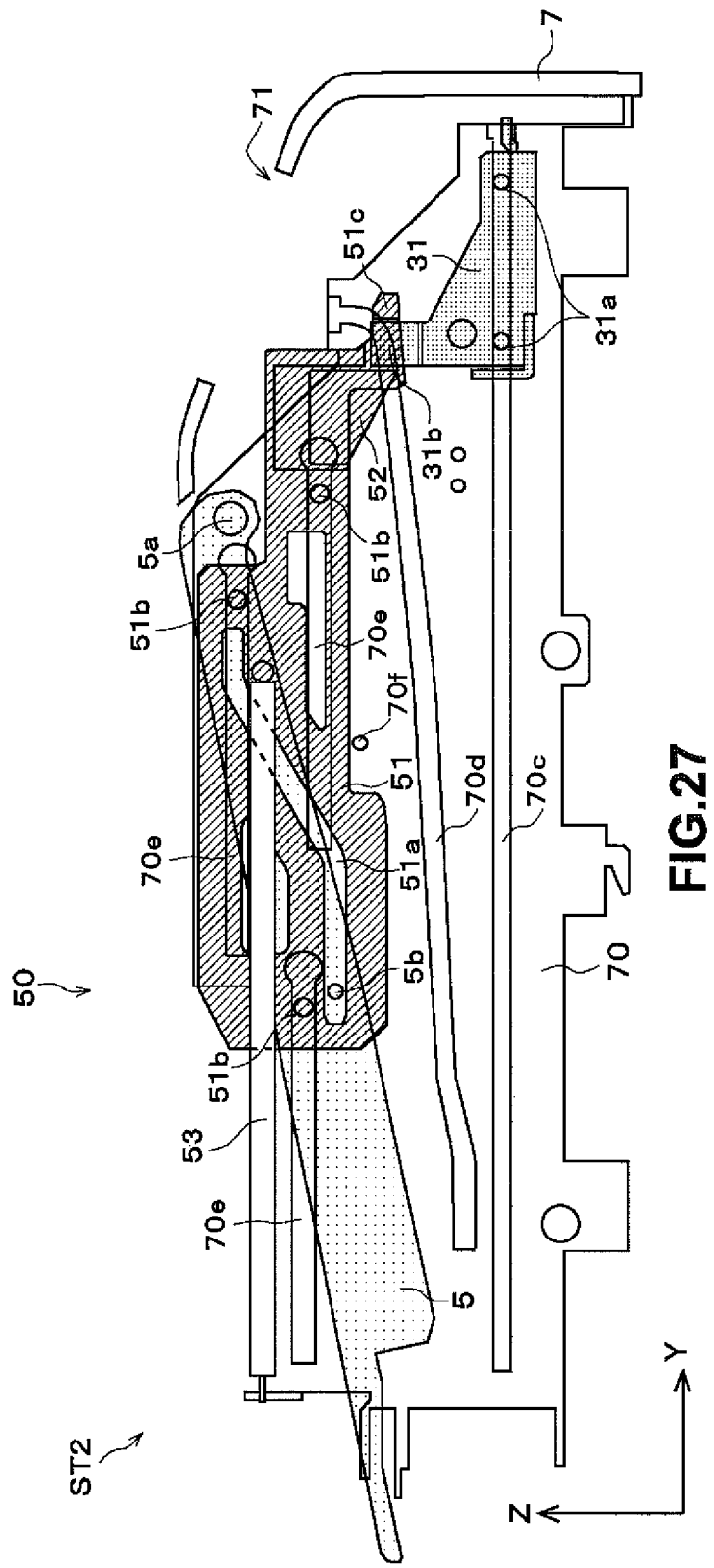
FIG. 27 shows a configuration of the lid moving mechanism.

Each of FIG. 24 to FIG. 27 shows a configuration of a lid moving mechanism 50, viewed from the right side (−X side) of the head-up display apparatus 1. FIG. 24 shows the non-use state ST1 and FIG. 27 shows the use state ST2. Moreover, each of FIG. 25 and FIG. 26 shows a transitional state from the non-use state ST1 or the use state ST2 to the other state.

In those drawings, a part of members are shown transparently and a configuration less relating to the lid moving mechanism 50 is omitted, for easy explanation. Moreover, the projector 4 fixed to the lid 5 is not illustrated in the drawings. As for the housing 7, only a partial portion near the first opening 71 is illustrated in the drawings. Each of FIG. 24 to FIG. 27 shows a configuration of the head-up display apparatus 1 viewed from the right side (−X side). The configuration viewed from the left side (+X side) is a configuration flipped horizontally.

The lid moving mechanism 50 includes a slide lever 51 on an inside surface of the side surface extending in the left-right direction of the main chassis 70 and the slide lever 51 moves linearly relative to the main chassis 70. Moreover, the side surface extending in the left-right direction of the main chassis 70 and the slide chassis 31 are a part of the lid moving mechanism 50.

The slide lever 51 includes three shafts 51b. The three shafts 51b are fitted into three guide grooves 70e extending in the front-rear direction (Y-axis direction) on the side surface of the main chassis 70. Thus, the slide lever 51 is configured to move in the front-rear direction (Y-axis direction) along the three guide grooves 70e to the main chassis 70. The slide lever 51 is pushed by a spring 53, a springy member, rearward (−Y side). One end of the spring 53 is connected to a portion of the slide lever 51 and the other end of the spring 53 is connected to the rear side (−Y side) of the main chassis 70.

Moreover, the slide lever 51 includes a guide groove 51a. The guide groove 51a is inclined in the front-rear direction (Y-axis direction) as a whole such that a front side (+Y side) of the guide groove 51a is higher than a rear side. However, portions near both ends of the guide groove 51a run in the front-rear direction (Y-axis direction). An interlocking shaft 5b provided to a side surface of the lid 5 is fitted into the guide groove 51a. Thus, when the slide lever 51 moves, the interlocking shaft 5b also moves along the guide groove 51a. The move of the interlocking shaft 5b causes the lid 5 (and the projector 4 fixed to the lid 5) to rotate around the rotation axis 5a.

A push by the slide chassis 31 causes the slide lever 51 to move in the front-rear direction (Y-axis direction). The slide chassis 31 pushes a projection 51c provided to a front (+Y side) end portion of the slide lever 51 or a lock lever 52 provided to a portion of the slide lever 51.

Figure 28:
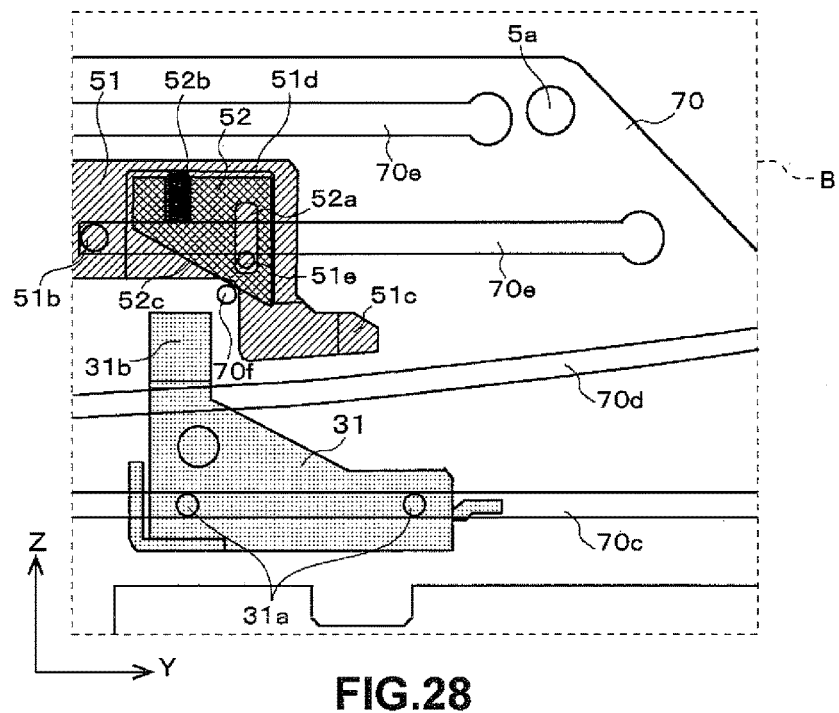
FIG. 28 shows an enlarged view of an area near a locking lever.
Figure 29:
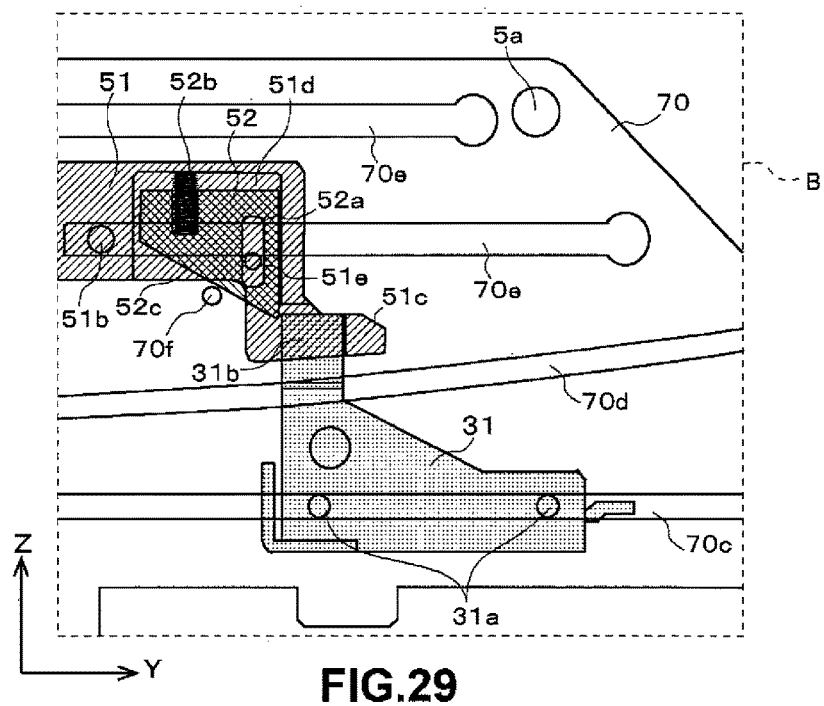
FIG. 29 shows an enlarged view of the area near the locking lever.
Figure 30:
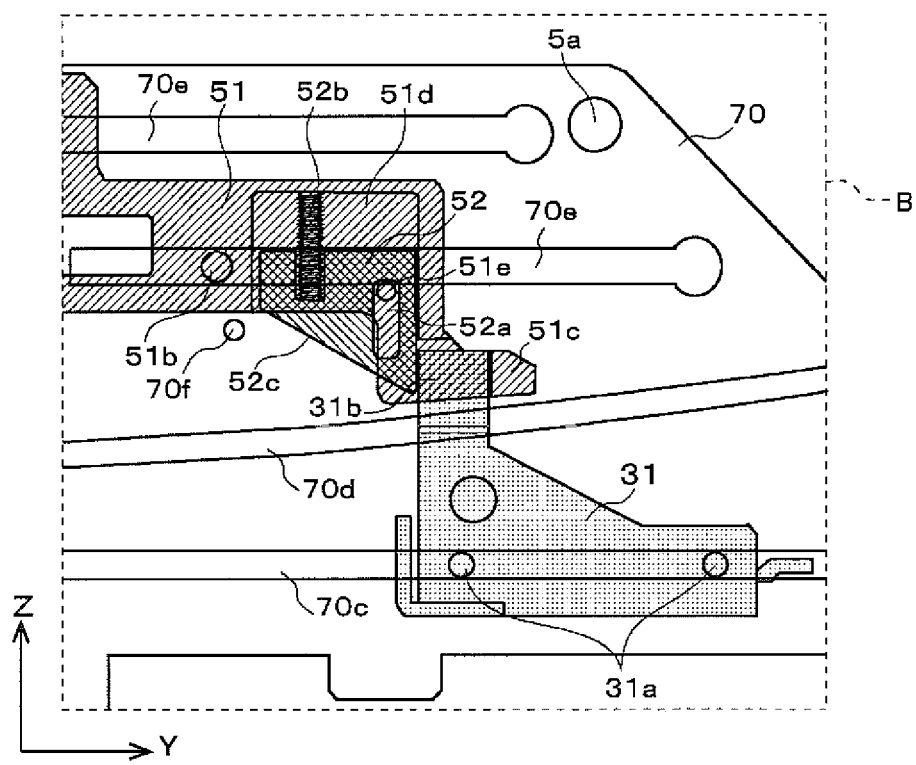
FIG. 30 shows an enlarged view of the area near the locking lever.

Each of FIG. 28 to FIG. 30 shows an enlarged view showing an area (corresponding to a region B shown in FIG.

25) near the projection 51c and the lock lever 52. Among these three drawings, FIG. 28 shows the slide chassis 31 located in the most rear side (−Y side) and FIG. 30 shows the slide chassis 31 located in the most front side (+Y side).

As shown in these drawings, the lock lever 52 is provided in a concave portion 51d of the slide lever 51. The concave portion 51d is formed on a front side (+Y side) of the slide lever 51 and has an opening on a bottom side (−Z side). The lock lever 52 includes a guide groove 52a extending in the up-down direction (Z-axis direction) and a shaft 51e provided to the slide lever 51 is fitted into the guide groove 52a. Thus, the lock lever 52 is configures to move in the up-down direction (Z-axis direction) to the slide lever 51.

Moreover, the lock lever 52 is pushed by a spring 52b, a springy member provided inside the concave portion 51d, toward the bottom side (−Z side). A lower edge 52c of the lock lever 52 is inclined relative to the horizontal line such that a front side (+Y side) of the lower edge 52c is lower. The lower edge 52c makes contact with a holding shaft 70f fixed to the side surface of the main chassis 70.

As shown in FIG. 28, when the slide chassis 31 is located on a relatively rear side (−Y side) and does not make contact with the slide lever 51, the lock lever 52 makes contact with the holding shaft 70f on the front side (+Y side) of the lower edge 52c. Thus, the lock lever 52 is pushed upward (+Z side) by the holding shaft 70f, and the entire lock lever 52 is housed in the concave portion 51d of the slide lever 51.

When the slide chassis 31 moves toward (+Y side) from a state shown in FIG. 28, a pressing part 31b provided to an upper portion of the slide chassis 31 makes contact with the projection 51c of the slide lever 51, as shown in FIG. 29. Then, a push to the projection 51c by the slide chassis 31 causes the slide lever 51 to move forward (+Y side). When the slide lever 51 moves forward (+Y side), the lock lever 52 provided to the slide lever 51 also moves forward (+Y side). Thus, the relative relations between the lock lever 52 and the holding shaft 70f is changed, and the lock lever 52 gradually moves downward (−Z side) by pushing force of the spring 52b.

Then, when the slide chassis 31 further moves forward (+Y side) from a state shown in FIG. 29, the lock lever 52 becomes out of contact with the holding shaft 70f, as shown in FIG. 30. Thus, the lock lever 52 further moves downward (−Z side), and a lower portion of the lock lever 52 protrudes from the concave portion 51d. As a result, the pressing part 31b provided to the upper portion of the slide chassis 31 is sandwiched by the projection 51c of the slide lever 51 and the lock lever 52.

When the slide chassis 31 moves forward (+Y side) in a state shown in FIG. 30, the pressing part 31b of the slide chassis 31 pushes the projection 51c of the slide lever 51 forward (+Y side). Thus, while the pressing part 31b of the slide chassis 31 remains sandwiched between the projection 51c and the lock lever 52, the slide lever 51 moves forward (+Y side).

Contrarily, when the slide chassis 31 moves rearward (−Y side) in the state shown in FIG. 30, the pressing part 31b of the slide chassis 31 pushes a front end portion of the lock lever 52 rearward (−Y side). Thus, the slide lever 51 to which the lock lever 52 is provided moves rearward (−Y side).

When the slide chassis 31 further moves rearward (−Y side), the lower edge 52c of the lock lever 52 comes into contact with the holding shaft 70f, as shown in FIG. 29, and the lock lever 52 gradually moves upward (+Z side).

When the slide chassis 31 further moves rearward (−Y side) from a state shown in FIG. 29, the lock lever 52 is pressed upward (+Z side) by the holding shaft 70f, as shown in FIG. 28, and then the substantially entire lock lever 52 is housed in the concave portion 51d of the slide lever 51. Thus, the pressing part 31b of the slide chassis 31 becomes out of contact with the lock lever 52 and the slide chassis 31 no longer pushes the lock lever 52. Moreover, a base end portion of the projection 51c of the slide lever 51 comes into contact with the holding shaft 70f so that the slide lever 51 is controlled not to move rearward (−Y side) further. As a result, the slide chassis 31 moves away from the slide lever 51 and moves rearward (−Y side) independently.

The slide chassis 31 pushes the projection 51c so that the slide lever 51 moves forward (+Y side). When the slide chassis 31 pushes the lock lever 52, the slide lever 51 moves rearward (−Y side).

The lid moving mechanism is explained with reference back to FIG. 24. In the non-use state ST1 shown in FIG. 24, the slide lever 51 is not in contact with the slide chassis 31 and the slide lever 51 is located on the most rear side (−Y side) in a movable range thereof. In this case, since the slide lever 51 is pushed rearward (−Y side) by the spring 53 while move of the slide lever 51 is controlled by the holding shaft 70f, the slide lever 51 is positioned stably. Moreover, the lid 5 is located on the most upper side (+Z side) in a movable range thereof to close the second opening 72. The interlocking shaft 5b of the lid 5 is located near a front (+Y side) end portion of the guide groove 51a.

When the slide chassis 31 moves forward (+Y side) from the non-use state ST1 shown in FIG. 24, the slide chassis 31, as shown in FIG. 25, comes into contact with the projection 51c of the slide lever 51 after the slide chassis 31 moves a predetermined distance. As described above, until the slide chassis 31 comes into contact with the slide lever 51, the slide lever 51 does not move. Therefore, the lid 5 keeps closing the second opening 72.

After the slide chassis 31 comes into contact with the projection 51c of the slide lever 51, the slide chassis 31 pushes the slide lever 51 forward (+Y side) and then the slide lever 51 moves forward (+Y side). The move of the slide lever 51 causes the interlocking shaft 5b of the lid 5 to move downward (−Z side) along an inclined portion of the guide groove 51a, as shown in FIG. 26. The move of the interlocking shaft 5b causes the lid 5 to rotate counterclockwise around the rotation axis 5a, and a rear portion (−Y side) of the lid 5 moves downward (−Z side).

When the slide chassis 31 further moves forward (+Y side) from a state shown in FIG. 26, the slide chassis 31 pushes the slide lever 51 forward (+Y side), as shown in FIG. 27, and the slide lever 51 further moves forward (+Y side). Thus, the interlocking shaft 5b of the lid 5 further moves along the guide groove 51a to an area near a rear (−Y side) end portion of the guide groove 51a. The move of the interlocking shaft 5b causes the lid 5 to move to the lowest side (−Z side) in the movable range thereof and the lid 5 opens the second opening 72. As a result, the projector 4 moving along with the lid 5 is located in the projection position (refer to FIG. 10).

Reversely, when the slide chassis 31 moves rearward (−Y side) from the use state ST2 shown in FIG. 27, the slide chassis 31 pushes the lock lever 52 and then the slide lever 51 moves rearward (−Y side). Then, each element of the lid moving mechanism 50 performs reverse move as compared to the foregoing move. As a result, the lid 5 closes the second opening 72 and then the head-up display apparatus 1 is changed to the non-use state ST1 shown in FIG. 24.

As described above, the lid moving mechanism 50 is configured to move the lid 5 and the projector 4 in tandem with the operation of the slide chassis 31. In other words, the lid moving mechanism 50 is configured to move the projector 4 in tandem with an operation of the combiner moving mechanism 30 of moving the combiner 3.

As described above, the combiner moving mechanism 30 is configured to change the angle of the reflective surface of the combiner 3 located in the use position relative to the horizontal direction by moving the slide chassis 31 slightly in the front-rear direction (Y-axis direction) in the use state ST2. In this manner, even in a case where the combiner moving mechanism 30 moves the slide chassis 31 to change the angle of the combiner 3, the lid moving mechanism 50 is configured not to move the projector 4 but to maintain the projector 4 in the projection position.

As shown in FIG. 27, the interlocking shaft 5b of the lid 5 is located near the rear (−Y side) end portion of the guide groove 51a in the use state ST2. A rear (−Y side) portion of the guide groove 51a runs relatively long in the front-rear direction (Y-axis direction). Therefore, even if the slide lever 51 moves slightly in the front-rear direction (Y-axis direction) in tandem with the move of the slide chassis 31, the position of the interlocking shaft 5b of the lid 5 is not changed. Thus, the lid moving mechanism 50 is configured to maintain the projector 4 in the projection position without moving the lid 5. As a result, even if the angle of the combiner 3 is adjusted, the projector 4 can project the image properly on the screen 40.

In the explanation described above, the slide lever 51 is moved rearward (−Y side) by a push given by the slide chassis 31 to the lock lever 52. However, the slide lever 51 may be moved rearward (−Y side) by using backward (−Y side) pushing force of the spring 53, instead of employment of the lock lever 52.

<4-4. Shutter Moving Mechanism>

Next explained is a shutter moving mechanism configured to move the shutter 6 as a part of the driving mechanism 2.

Figure 31:
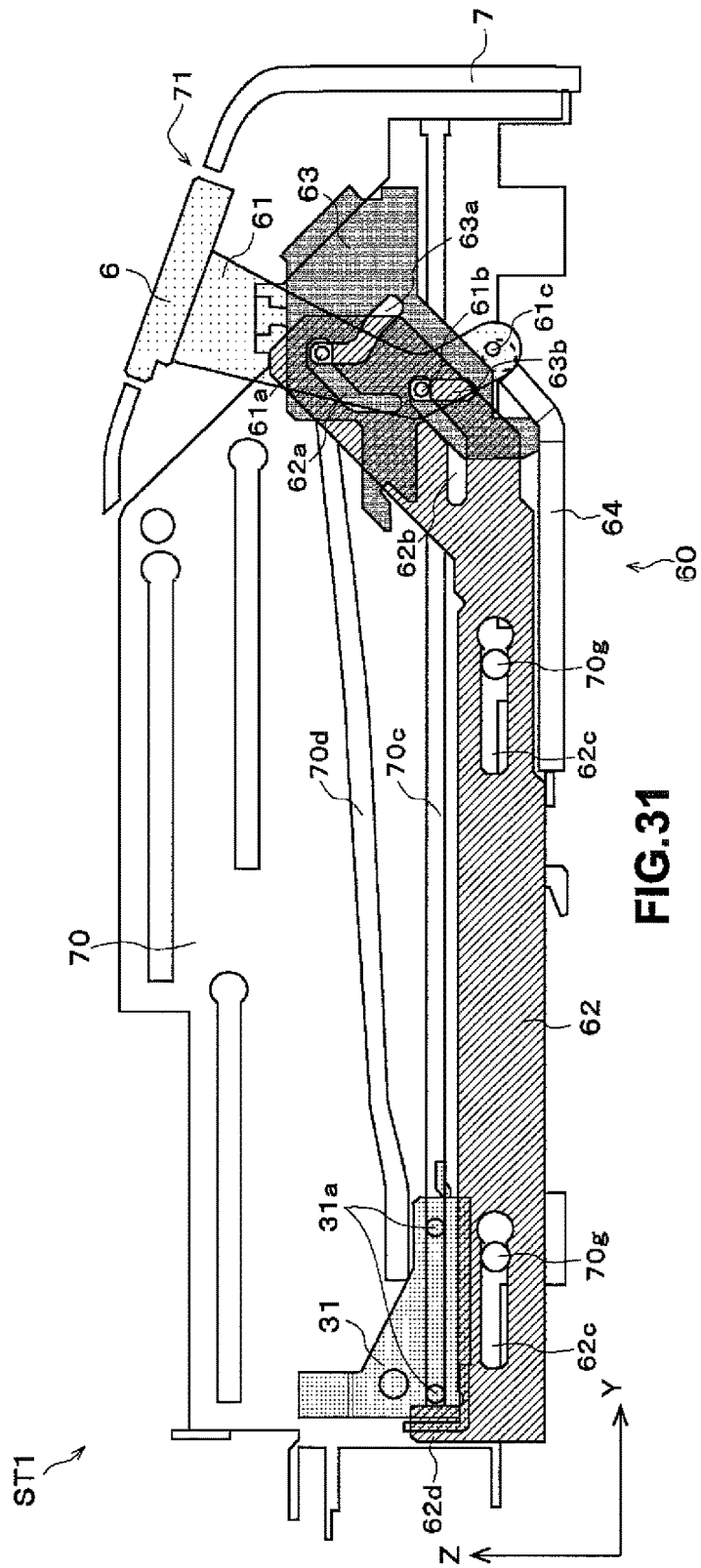
FIG. 31 shows a configuration of a shutter moving mechanism.
Figure 32:
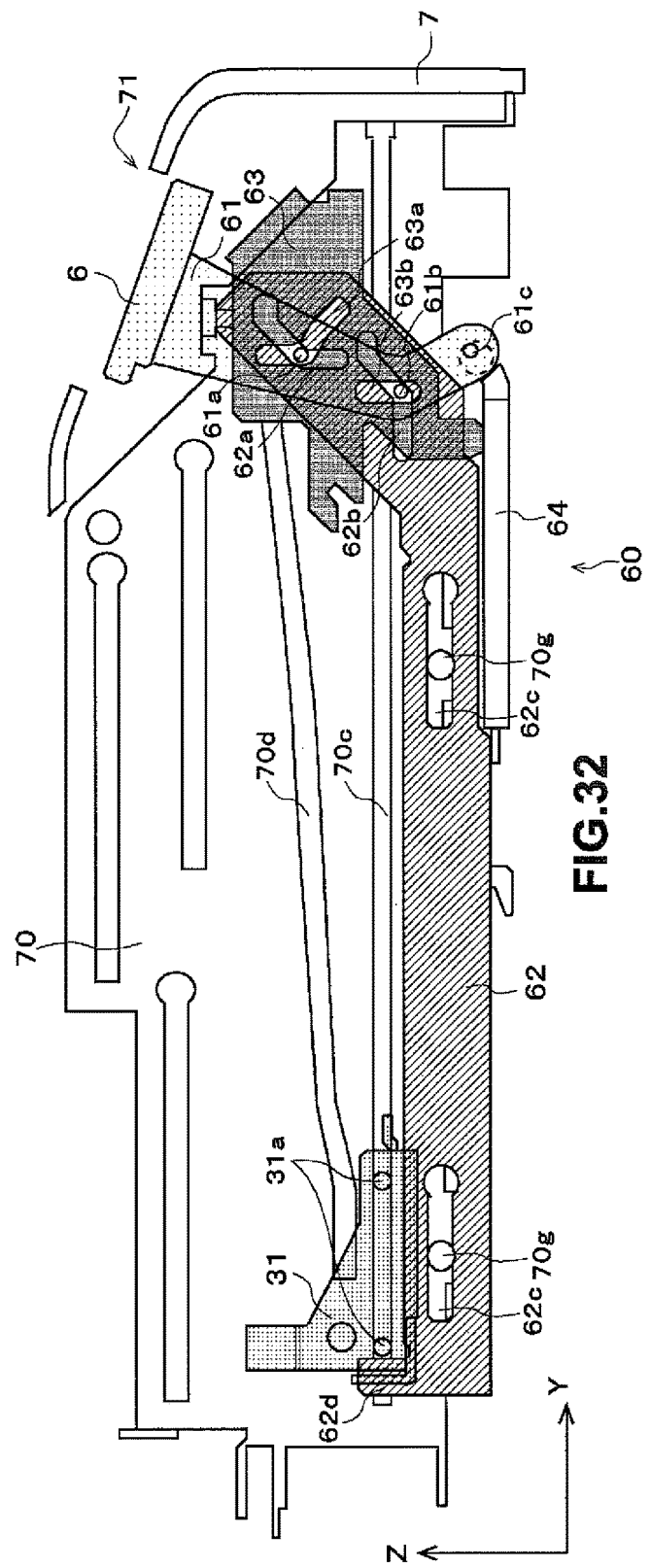
FIG. 32 shows a configuration of the shutter moving mechanism.
Figure 33:
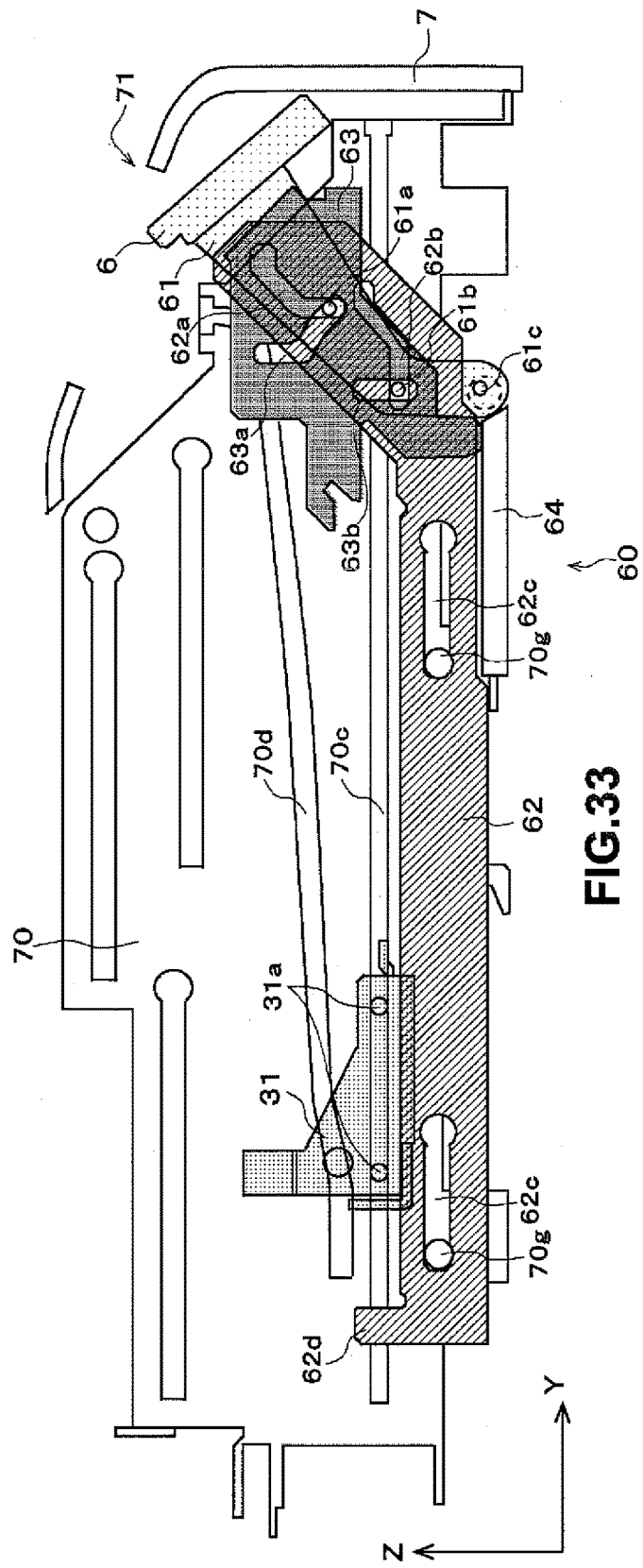
FIG. 33 shows a configuration of the shutter moving mechanism.

Each of FIG. 31 to FIG. 33 shows a configuration of a shutter moving mechanism 60 viewed from the right side (−X side) of the head-up display apparatus 1. FIG. 31 shows a state where the shutter 6 closes the first opening 71 (the non-use state ST1) and FIG. 33 shows a state where the first opening 71 is not closed by the shutter 6. Moreover, FIG. 32 shows a transitional state from the state shown in FIG. 31 or FIG. 33 to the other state.

In those drawings, a part of members are shown transparently and a configuration less relating to the shutter moving mechanism 60 is omitted, for easy explanation. As for the housing 7, only a partial portion near the first opening 71 is illustrated in the drawings. Each of FIG. 31 to FIG. 33 shows a configuration of the shutter moving mechanism 60 viewed from the right side (−X side) of the head-up display apparatus 1. The configuration viewed from a left side (+X side) is a configuration flipped horizontally.

The shutter moving mechanism 60 includes a slide lever 62, a fixing lever 63 and a rotation lever 61. Moreover, the side surface extending in the left-right direction of the main chassis 70 and the slide chassis 31 are a part of the shutter moving mechanism 60.

The slide lever 62 is provided to an outside surface of the side surface extending in the left-right direction of the main chassis 70. The slide lever 62 includes two guide grooves 62c extending in the front-rear direction (Y-axis direction). Two shafts 70g fixed to the side surface of the main chassis 70 are fitted into the two guide grooves 62c, respectively. Thus, the slide lever 62 is configured to move in the front-rear direction (Y-axis direction) along the guide grooves 62c relative to the main chassis 70.

The slide lever 62 includes a first guide groove 62a and a second guide groove 62b on a front side (+Y side) thereof. The first guide groove 62a includes an upper portion inclined in the front-rear direction (Y-axis direction) such that a front side (+Y side) of the first guide groove 62a is higher than a rear side thereof and a lower portion extending in the up-down direction (Z-axis direction). The second guide groove 62b includes a front portion inclined in the front-rear direction (Y-axis direction) such that a front side (+Y side) of the second guide groove 62b is higher than a rear side thereof and a lower portion extending in the front-rear direction (Y-axis direction).

The fixing lever 63 is fixed to the front side (+Y side) of the main chassis 70. The fixing lever 63 includes a third guide groove 63a and a fourth guide groove 63b. The third guide groove 63a includes an upper portion extending in the up-down direction (Z-axis direction) and a lower portion inclined in the front-rear direction (Y-axis direction) such that a front side (+Y side) of the third guide groove 63a is lower than a rear side thereof. The fourth guide groove 63b runs in the up-down direction (Z-axis direction).

The rotation lever 61 is fixed to a back surface (a surface facing an inside of the housing 7) of the shutter 6. The rotation lever 61 includes a first shaft 61a, a second shaft 61b and a third shaft 61c.

The first shaft 61a is fitted into both of the first guide groove 62a of the slide lever 62 and the third guide groove 63a of the fixing lever 63. Moreover, the second shaft 61b is fitted into both of the second guide groove 62b of the slide lever 62 and the fourth guide groove 63b of the fixing lever 63. The third shaft 61c is provided to a lower (−Z side) end portion of the rotation lever 61.

Further, the shutter moving mechanism 60 includes a spring 64, a springy member. One end of the spring 64 is connected to a portion of the slide lever 62 and the other end is connected to the third shaft 61c of the rotation lever 61. The slide lever 62 is pushed forward (+Y side) and the third shaft 61c of the rotation lever 61 is pushed rearward (−Y side) by the spring 64.

The protrusion 62d provided on a rear end portion of the slide lever 62 comes into contact with the slide shafts 31a on the rear side (−Y side) of the slide chassis 31. The slide lever 62 is controlled by the slide shafts 31a not to move forward (+Y side) further. When the slide chassis 31 moves forward (+Y side), the slide lever 62 moves forward (+Y side) by pushing force of the spring 64. Moreover, when the slide chassis 31 moves rearward (−Y side), the protrusion 62d of the slide lever 62 is pushed by the slide shafts 31a and then the slide lever 62 moves rearward (−Y side).

When the slide lever 62 moves in the front-rear direction (Y-axis direction), a range of a crossover between the guide groove 62a of the slide lever 62 and the guide groove 63a of the fixing lever 63 and a range of a crossover between the guide groove 62b of the slide lever 62 and the guide groove 63b of the fixing lever 63 are changed. Thus, the first shaft 61a and the second shaft 61b of the rotation lever 61 move according to the crossovers. As a result, the shutter 6 moves.

As shown in FIG. 31, in the non-use state ST1, the shutter 6 closes the first opening 71. A position of a surface (a surface facing outward) of the shutter 6 is substantially matched with a position of a surface of the housing 7. Moreover, the first shaft 61a of the rotation lever 61 is provided to an upper (+Z side) end portion of both the first guide groove 62a and the third guide groove 63a, and the second shaft 61b of the rotation lever 61 is provided to an upper (+Z side) end portion of both the second guide groove 62b and the fourth guide groove 63b. The slide lever 62 is controlled by the slide shafts 31a of the slide chassis 31 not to move forward (+Y side) further.

When the slide chassis 31 moves forward (+Y side) from the non-use state ST1 shown in FIG. 31, the slide lever 62 moves forward (+Y side) by pushing force of the spring 64, as shown in FIG. 32. The move of the slide lever 62 causes the first shaft 61a of the rotation lever 61 to move downward (−Z side) along an upper portion of the first guide groove 62a and along an upper portion of the third guide groove 63a. The move of the slide lever 62 also causes the second shaft 61b of the rotation lever 61 to move downward (−Z side) along a front portion of the second guide groove 62b and along the fourth guide groove 63b of the rotation lever 61.

Thus, the entire rotation lever 61 moves downward (−Z side). As a result, the shutter 6 fixed to the rotation lever 61 moves downward (−Z side), i.e., a direction toward the inside of the housing 7, and enter the housing 7. A surface of the shutter 6 becomes lower than a surface of the housing 7 and a concave portion is formed at the first opening 71.

The slide chassis 31 further moves forward (+Y side) from a state shown in FIG. 32, the slide lever 62 further moves forward (+Y side) as shown in FIG. 33. However, when rear (−Y side) end portions of the two guide grooves 62c of the slide lever 62 come into contact with two shafts 71g, the slide lever 62 is controlled not to move forward (+Y side) further. Therefore, after that, the slide chassis 31 moves separately from the protrusion 62d of the slide lever 62 and moves forward (+Y side) independently.

Moreover, the move of the slide lever 62 causes the first shaft 61a of the rotation lever 61 to move forward (+Y side) and downward (−Z side) along a lower portion of the first guide groove 62a and along a lower portion of the third guide groove 63a. On the other hand, since the second shaft 61b of the rotation lever 61 moves on a rear side of the second guide groove 62b in the front-rear direction (Y-axis direction), the position of the second shaft 61b is constant. Moreover, the third shaft 61c provided to the lower end portion of the rotation lever 61 is pushed rearward (−Y side) by the spring 64. Thus, an upper portion of the rotation lever 61 rotates clockwise around the second shaft 61b in the drawing. As a result, the shutter 6 fixed to the rotation lever 61 also rotates clockwise in the housing 7 and moves frontward (+Y side) to open the first opening 71.

Reversely, when the slide chassis 31 moves rearward (−Y side) from a state shown in FIG. 33, the protrusion 62d of the slide lever 62 is pushed by the slide shafts 31a and the slide lever 62 moves rearward (−Y side). Then, each function of the shutter moving mechanism 60 performs reverse move as compared to the foregoing move. Accordingly, after moving rearward (−Y direction) in the housing 7, the shutter 6 moves upward (+Z direction) from immediately beneath the first opening 71 and closes the first opening 71. As a result, the head-up display apparatus 1 is changed to the non-use state ST1 shown in FIG. 31.

As described above, the shutter moving mechanism 60 is configured to open the first opening 71 by moving the shutter 6 downward (−Z direction), i.e., into the inside of the housing 7, from the non-use state ST1 and then by moving forward (+Y direction) different from downward (−Z direction) in the housing 7. Since the shutter moving mechanism 60 is configured to move the shutter 6 as described above, the position of the surface of the shutter 6 is substantially matched with the position of the surface of the housing 7 in the non-use state ST1. Thus, an interspace between the shutter 6 and the first opening 71 can be reduced in the non-use state ST1. And also, a foreign object is effectively prevented from entering the inside of the housing 7. At the same time, aesthetic appearance of the head-up display apparatus 1 in the non-use state ST1 can be improved.

<5. Modifications>

The embodiment of the invention is described above. However, the invention is not limited to the foregoing embodiment, but various modifications are possible. Examples of such modifications are hereinafter described. All forms including the foregoing embodiment and modifications below may be combined arbitrarily.

In the foregoing embodiment, the head-up display apparatus 1 is embedded in the dashboard 91. However the head-up display apparatus 1 may be mounted to a vehicle in another method. For example, the head-up display apparatus 1 may be placed and fixed on the dashboard 91 or may be provided to a ceiling of the vehicle. In a case where the head-up display apparatus 1 is provided to the ceiling of the vehicle, a configuration of the head-up display apparatus 1 should be upside-down as compared to the configuration described above.

Moreover, in the foregoing embodiment, the slide chassis 31 moves in the horizontal direction. However, a predetermined direction in which the slide chassis 31 moves may be inclined relative to the horizontal direction. Further, the front-rear direction (Y-axis direction) or the left-right direction (X-axis direction) described above may be inclined relative to the horizontal direction.

Further, in the foregoing embodiment, the head-up display apparatus 1 is turned on or turned off in tandem with turn-on or turn-off of the ACC switch of the vehicle. However, the head-up display apparatus 1 may be tuned on or turned off in response to a user operation.

Further, in the foregoing embodiment, a rotary encoder is used for the position sensor 28. However, another type of sensors, such as a variable resistor and a switch, may be used.

Further, in the foregoing embodiment, only one motor 29 is provided as a driving source. The motor 29 moves the slide chassis 31 and the slide chassis 31 is used for all of the combiner moving mechanism 30, the lid moving mechanism 50 and the shutter moving mechanism 60. On the other hand, an independent driving source may be provided to each of the combiner moving mechanism 30, the lid moving mechanism 50 and the shutter moving mechanism 60.

Further, in the foregoing embodiment, the head-up display apparatus 1 is used in a vehicle, such as a car. However, the head-up display apparatus 1 may be used in another machine, such as an aircraft, a boat and a ship, or may be used in a house, a shop, an office, a factory or other places.

While the invention has been shown and described in detail, the foregoing description is in all aspects illustrative and not restrictive. It is therefore understood that numerous other modifications and variations can be devised without departing from the scope of the invention.

What is claimed is:

1. A head-up display apparatus comprising:
   a projector having a lens and that emits projection light from the lens to cause an image to be displayed on a screen, the projector is movably mounted within the display apparatus and is movable between a stored position and a projection position at which the projector emits the projection light to cause the image to be displayed on the screen;
   a combiner that reflects display light from the image displayed on the screen when the combiner is placed in a use position;

a first moving mechanism configured to move the combiner between the use position and a storage position in a storage space; and a second moving mechanism configured to move the projector from the stored position to the projection position in the storage space when the combiner is placed in the use position.

2. The head-up display apparatus according to claim 1, wherein the second moving mechanism is configured to move the projector to the stored position which is in a light path space when the combiner is placed in the storage position, the light path space serving as a part of a light path of the display light between the screen and the combiner.

3. The head-up display apparatus according to claim 2, further comprising:

a lid that closes the light path space when the combiner is placed in the storage position and that opens the light path space when the combiner is placed in the use position, wherein the projector is fixed to the lid and moves together with the lid.

4. The head-up display apparatus according to claim 1, wherein the first moving mechanism is configured to change an angle of the combiner to a predetermined direction while moving the combiner in the predetermined direction.

5. The head-up display apparatus according to claim 4, wherein the first moving mechanism comprises:

a slide member a part of which is fitted into a first guide groove extending in the predetermined direction;

a holder that holds the combiner and that is rotatably connected to the slide member, a part of the holder being fitted into a second guide groove inclined relative to the predetermined direction; and a force providing member that pushes the slide member toward the second guide groove and pushes the holder toward the first guide groove.

6. The head-up display apparatus according to claim 5, further comprising:

a touching member that increases force of the force providing member by touching the force providing member when the combiner is placed in the use position.

7. The head-up display apparatus according to claim 1, wherein the second moving mechanism is configured to move the projector in tandem with an operation of the first moving mechanism of moving the combiner.

8. The head-up display apparatus according to claim 7, wherein the second moving mechanism is configured to maintain the projector in the projection position when the first moving mechanism changes the angle of the combiner placed in the use position.

9. The head-up display apparatus according to claim 1, further comprising:

a housing that covers the storage space and on which an opening, serving as a moving path of the combiner, is formed;

a shutter that opens and closes the opening on the housing; and a third moving mechanism configured to move the shutter closing the opening in a first direction toward an inside of the housing and then to move the shutter in a second direction different from the first direction in the housing.

10. The head-up display apparatus according to claim 1, wherein at least a portion of the projection position overlaps the storage position such that the projector cannot be located in the projection position while the combiner is located in the storage position.

11. The head-up display apparatus according to claim 2, wherein the light path space serves as a part of the light path of the display light when the combiner is in the use position.

* * * * *